US012610292B2

(12) United States Patent
Chandrashekar et al.

(10) Patent No.: US 12,610,292 B2
(45) Date of Patent: Apr. 21, 2026

(54) ENHANCED LAYER 1-LAYER 2 (L1/L2) TRIGGERED MOBILITY (LTM) HANDOVER (HO) PROCEDURE

(71) Applicants:RAKUTEN MOBILE, INC., Tokyo (JP); RAKUTEN SYMPHONY, INC., Tokyo (JP)

(72) Inventors: Subramanya Chandrashekar, Karnataka (IN); Koichiro Kitagawa, Tokyo (JP)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 335 days.

(21) Appl. No.: 18/563,375

(22) PCT Filed: Oct. 17, 2023

(86) PCT No.: PCT/US2023/035262
§ 371 (c)(1),
(2) Date: Nov. 22, 2023

(87) PCT Pub. No.: WO2024/167511
PCT Pub. Date: Aug. 15, 2024

(65) Prior Publication Data
US 2025/0081052 A1      Mar. 6, 2025

(30) Foreign Application Priority Data
Feb. 9, 2023 (IN) .............................. 202321008515

(51) Int. Cl.
*H04W 36/08* (2009.01)
*H04W 36/00* (2009.01)

(52) U.S. Cl.
CPC ... *H04W 36/0072* (2013.01); *H04W 36/0058* (2018.08); *H04W 36/08* (2013.01)

(58) Field of Classification Search
CPC ......... H04W 36/0061; H04W 36/0079; H04W 36/0077; H04W 36/0072; H04W 36/0055;
(Continued)

(56) References Cited

U.S. PATENT DOCUMENTS

| | | | |
|---|---|---|---|
| 2023/0388871 A1* | 11/2023 | Guo .................. | H04W 36/0069 |
| 2024/0147328 A1* | 5/2024 | Kim ...................... | H04W 36/30 |
| 2024/0284277 A1* | 8/2024 | Jeon .................. | H04W 36/0072 |

FOREIGN PATENT DOCUMENTS

| | | | | |
|---|---|---|---|---|
| WO | WO-2023192692 A2 * | 10/2023 | ........ | H04W 56/0015 |
| WO | WO-2024076379 A1 * | 4/2024 | ........ | H04W 56/0045 |
| WO | WO-2025042396 A1 * | 2/2025 | ...... | H04W 36/00837 |

* cited by examiner

*Primary Examiner* — Kamran Afshar
(74) *Attorney, Agent, or Firm* — HAUPTMAN HAM, LLP

(57) ABSTRACT

A Layer 1-Layer 2 (L1/L2) Triggered Mobility (LTM) handover (HO) procedure, and method. A gNB-Centralized Unit User Plane (gNB-CU-CP) sends Radio Resource Control (RRC) messages with LTM candidate cell configuration of LTM candidate gNB-DUs. Based on the RRC messages, a Layer (L1) Measurement Report is sent to the LTM candidate gNB-DUs. In response, the LTM candidate gNB-DUs determine whether a radio condition of the LTM candidate gNB-DUs meet a predetermined resource reservation criteria. Based on meeting the predetermined resource reservation criteria, the LTM candidate gNB-DUs initiate reservation of radio resources for an LTM candidate cell for a LTM cell switch. The LTM candidate gNB-DUs send to the gNB-CU-CP an updated LTM candidate cell configuration. The gNB-CU-CP sends the updated radio resource configuration to the UE via the serving gNB-DU.

20 Claims, 6 Drawing Sheets

(58) Field of Classification Search
CPC ............. H04W 36/08; H04W 36/0016; H04W
36/0083; H04W 36/00838
See application file for complete search history.

ENHANCED LAYER 1-LAYER 2 (L1/L2) TRIGGERED MOBILITY (LTM) HANDOVER (HO) PROCEDURE

RELATED APPLICATIONS

The present application is a National Phase of International Application No. PCT/US2023/035262, filed Oct. 17, 2023, and claims priority based on Indian Patent Application number 202321008515, filed Feb. 9, 2023.

TECHNICAL FIELD

This description relates to a Layer 1-Layer 2 (L1/L2) Triggered Mobility (LTM) handover (HO) procedure, and method of using the same.

BACKGROUND

Handover (mobility) is a process of transferring an ongoing communication session of a user equipment (UE) from one cell (i.e., base station or gNodeB (gNB)) to another cell in connected state. The primary motivation behind handover is to ensure seamless connectivity and continuity of service for the user, especially while the user is on the move. Mobility can be categorized into two types: beam level mobility and cell level mobility.

The beam level mobility does not rely on explicit radio resource control (RRC) signaling to be triggered. The triggering is able to occur within a cell, or between cells (i.e., Inter-Cell Beam Management (ICBM)). The gNB provides the UE with measurement configuration for triggering channel and interference measurements and reports. Beam level mobility is then dealt with at lower layers by means of Physical Layer (PHY) and Medium-Access Control (MAC) layer control signaling, and the UE does not rely on explicit RRC signaling to change to a target beam.

In handover types until 3rd Generation Partnership Project (3GPP) Release 17, a serving cell change is triggered by Layer 3 (L3) measurements and is accomplished using RRC signaling (i.e., Reconfiguration with Synchronization information element) for change of Primary Cell (PCell) and Primary Secondary Cell (PSCell). Reconfiguration of upper layers (e.g., RRC or Packet Data Convergence Protocol (PDCP)) and/or resetting of lower layers (e.g., MAC and/or PHY) is used and leads to longer latency, larger overhead and longer interruption time than beam level mobility.

Release 18 introduced Layer 1/Layer 2 (L1)/L2 Triggered Mobility (LTM) to enable a serving cell change via L1/L2 signaling, while keeping configuration of the upper layers and/or minimizing changes of configuration of the lower layers. LTM helps to reduce the latency, overhead and interruption time during handover. The LTM supports intra-Distributed Unit (DU) and intra-Centralized Unit (CU)-inter-DU mobility. During the LTM, user plane is continued whenever possible (e.g. intra-DU), without reset, with the target cell to avoid data loss and the additional delay of data recovery. Further, security is not updated in intra NG-RAN node LTM.

In L1/L2-triggered mobility (LTM), a gNB receives a L1 measurement reports from UEs, and on their basis the gNB changes the Serving Cell(s) of the UE through MAC CE. The gNB prepares one or multiple candidate cells and provides the candidate cell configurations to the UE through RRC message. A target cell is a candidate cell which is selected for LTM cell switch. Herein, candidate cell (c) and target cell(s) are used interchangeably. Then LTM cell switch is triggered, by selecting one of the candidate configurations as target configuration for LTM by the gNB. The candidate cell configurations is able to be added, modified and released by network via RRC signaling.

Still, the duration between LTM Handover (HO) preparation and execution is significant. In addition, not all target candidate cell configurations end up in LTM serving cell changes. Hence, resource reservation (including Physical Random Access CHannel (PRACH) preambles) is an issue.

In the legacy baseline NR L3 mobility, the UE obtains the Timing Advance (TA) towards the target cell and completes the Uplink (UL) synchronization via the RACH procedure. Contention Free Random Access (CFRA) involves a 4-step RACH process and Contention Based Random Access (CBRA) involves a 2-step RACH process. The UE is able to complete the RACH procedure in two steps (Msg1+Msg2 or MsgA+MsgB), which is faster than CBRA in 4-step RACH (Msg1 to Msg4). However, even with the CFRA in 4-step RACH or CBRA in 2-step RACH, the UE waits for the available PRACH occasion, send the preamble and wait for the RAR. The time for the RACH procedure is around 10~20 milliseconds.

RACH-less solutions have been studied to reduce the interruption time during handover. However, RACH-less HO is sometimes not feasible, e.g., in response to the timing advance (TA) acquired from the candidate/target cell being expired or not valid. RACH-less HO is not possible even when the TA of the candidate/target cell is not able to be acquired.

A second issue involves data forwarding. Currently, data forwarding is slow and also involves considerable overhead. For example, data forwarding to multiple target cells is expensive in terms of processing and buffer occupancy.

SUMMARY

In at least embodiment, a method for preparing and executing a Layer 1-Layer 2 (L1/L2) Triggered Mobility (LTM) Handover (HO) procedure includes receiving, an L1 Measurement Report directly at one or more LTM candidate gNB-Distributed Units (gNB-DUs) from User Equipment (UE) or from a serving gNB-DU, wherein the L1 Measurement Report is based on one or more Radio Resource Control (RRC) messages with LTM candidate cell configuration of the one or more LTM candidate gNB-DUs sent earlier to the UE via a serving cell, in response to receiving the L1 Measurement Report, determining by the one or more LTM candidate gNB-DUS, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more LTM candidate gNB-DUs to acquire timing advance, initiating, by the one or more LTM candidate gNB-DUs, reservation of partial or full radio resources for one of one or more LTM candidate cells for a LTM cell switch from the serving cell to the one of the one or more LTM candidate cells by the UE, and sending an updated radio resource configuration for the candidate/target cell having the partial or full radio resources of the one or more LTM candidate cells to the UE via the serving gNB-DU.

In at least one embodiment, a Next Generation-Radio Access Network (NG-RAN) Node comprising a candidate distributed unit (DU), the candidate DU includes a memory storing computer-readable instructions, and a processor connected to the memory, wherein the processor is configured to execute the computer-readable instructions to receive a Layer 1 (L1) Measurement Report directly at one or more Layer 1-Layer 2 (L1/L2) Triggered Mobility (LTM) candidate gNB-Distributed Units (gNB-DUs) from User Equipment (UE) or from a serving gNB-DU, wherein the L1 Measurement Report is based on one or more Radio Resource Control (RRC) messages with LTM candidate cell configuration of one or more LTM candidate gNB-DUs sent earlier to the UE via a serving cell, in response to receiving the L1 Measurement Report, determine whether a radio condition of one of the one or more LTM candidate gNB-DUs meets a predetermined resource reservation criteria, based on the radio condition of the one of the one or more LTM candidate gNB-DUs meeting the predetermined resource reservation criteria or upon the UE performing Uplink (UL) Synchronization by sending a Random-Access CHannel (RACH) request to the one or more candidate gNB-DUs to acquire timing advance of one or more LTM candidate cells, initiate, using the one or more LTM candidate gNB-DUs, reservation of partial or full radio resources for the one of one or more LTM candidate cells for an LTM cell switch from the serving cell to the one of the one or more LTM candidate cells by the UE, and sending an updated radio resource configuration for the one or more candidate cells having the partial or full radio resources of the one or more LTM candidate cells to the UE via the serving gNB-DU.

In at least one embodiment, a non-transitory computer-readable media having computer-readable instructions stored thereon, which when executed by a processor causes the processor to perform operations for receiving, a Layer 1 (L1) Measurement Report directly at one or more LTM candidate gNB-Distributed Units (gNB-DUs) from User Equipment (UE) or from a serving gNB-DU, wherein the L1 Measurement Report is based on one or more Radio Resource Control (RRC) messages with LTM candidate cell configuration of the one or more LTM candidate gNB-DUs sent earlier to the UE via a serving cell, in response to receiving the L1 Measurement Report, determining by the one or more LTM candidate gNB-DUs, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more candidate gNB-DUs to acquire timing advance, initiating, by the one or more LTM candidate gNB-DUs, reservation of partial or full radio resources for one of one or more LTM candidate cells for a LTM cell switch from the serving cell to the one of the one or more LTM candidate cells by the UE, and sending an updated radio resource configuration for the one or more candidate cells having the partial or full radio resources of the one or more LTM candidate cells to the UE via the serving gNB-DU.

In at least one embodiment, a method for preparing and executing a Lower layer Triggered Mobility (LTM) Handover (HO) procedure includes receiving, at a candidate gNB Distributed Unit (gNB-DU), a Layer 1 (L1) Measurement Report for one or more LTM candidate cells, based on the L1 Measurement Report, determining by the candidate gNB-DU whether a radio condition of one of the one or more LTM candidate cells meets a predetermined resource reservation criteria, based on the radio condition of the one of the one or more LTM candidate cells meeting the predetermined resource reservation criteria or upon the UE performing Uplink (UL) Synchronization by sending a Random-Access CHannel (RACH) request to the one or more candidate gNB-DUs to acquire timing advance Uplink (UL) Synchronization, determining reserved partial or full radio resources for the one of the one or more LTM candidate cells for a LTM cell switch to the one of the one or more LTM candidate cells by the UE, and sending, by the candidate gNB-DU to a gNB-Centralized Unit Control Plane (gNB-CU-CP), an updated LTM candidate cell configuration corresponding to the reserved partial or full radio resources.

In at least one embodiment, a Next Generation-Radio Access Network (NG-RAN) Node comprising a candidate gNB Distributed Unit (gNB-DU), the gNB-DU includes a memory storing computer-readable instructions, and a processor connected to the memory, wherein the processor is configured to execute the computer-readable instructions to a memory storing computer-readable instructions; and a processor connected to the memory, wherein the processor is configured to execute the computer-readable instructions to perform operations to: receive a Layer 1 (L1) Measurement Report for the one or more LTM candidate cells, based on the L1 Measurement Report, determine whether a radio condition of one of the one or more LTM candidate cells meets a predetermined resource reservation criteria, based on the radio condition of the one of the one or more LTM candidate cells meeting the predetermined resource reservation criteria or upon the UE performing Uplink (UL) Synchronization by sending a Random-Access CHannel (RACH) request to the one or more candidate gNB-DUs to acquire timing advance Uplink (UL) Synchronization, determining reserved partial or full radio resources for the one of the one or more LTM candidate cells for a LTM cell switch to the one of the one or more LTM candidate cells by the UE, and sending, to a gNB-Centralized Unit Control Plane (gNB-CU-CP), an updated LTM candidate cell configuration corresponding to the reserved partial or full resources.

In at least one embodiment, a non-transitory computer-readable media having computer-readable instructions stored thereon, which when executed by a processor causes the processor to perform operations for receiving, at a candidate gNB Distributed Unit (gNB-DU), a Layer 1 (L1) Measurement Report for one or more LTM candidate cells, based on the L1 Measurement Report, determining by the candidate gNB-DU whether a radio condition of one of the one or more LTM candidate cells meets a predetermined resource reservation criteria, based on the radio condition of the one of the one or more LTM candidate cells meeting the predetermined resource reservation criteria or upon the UE performing Uplink (UL) Synchronization by sending a Random-Access CHannel (RACH) request to the one or more candidate gNB-DUs to acquire timing advance Uplink (UL) Synchronization, determining reserved partial or full radio resources for the one of the one or more LTM candidate cells for a LTM cell switch to the one of the one or more LTM candidate cells by the UE, and sending, by the candidate gNB-DU to a gNB-Centralized Unit Control Plane (gNB-CU-CP), an updated LTM candidate cell configuration corresponding to the reserved partial or full radio resources.

In at least one embodiment, a method for preparing and executing a Lower layer Triggered Mobility (LTM) Handover (HO) procedure includes sending, by a gNB-Centralized Unit Control Plane (gNB-CU-CP) to a User Equipment directly or via a serving gNB-Distributed Units (gNB-DU), one or more Radio Resource Control (RRC) messages with LTM candidate cell configuration of one or more LTM candidate gNB-DUs, based on the one or more RRC messages, sending, by User Equipment or the serving gNB-DU, a Layer 1 (L1) Measurement Report to the one or more LTM candidate gNB-DUs, the L1 measurement report, receiving, at the one or more LTM candidate gNB-DUs, the L1 Measurement Report, in response to receiving the L1 Measurement Report, determining, by the one or more LTM candidate gNB-DUs, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more candidate gNB-DUs to acquire timing advance Uplink (UL) Synchronization, initiating, by the one or more LTM candidate gNB-DUs, reservation of partial or full radio resources for one of one or more LTM candidate cells for a LTM cell switch from the serving cell to the one of the one or more LTM candidate cells by the UE, sending, by the one or more LTM candidate gNB-DUs to a gNB-CU-CP, an updated LTM candidate cell configuration corresponding to the partial or full radio resources, and sending, by the gNB-CU-CP, the updated radio resource configuration having the partial or full radio resources of the one or more LTM candidate cells to the UE via the serving gNB-DU.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
FIG. 1 illustrates a disaggregated Radio Access Network (RAN) architecture according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above." "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In at least one embodiment, a method for preparing and executing a Lower layer Triggered Mobility (LTM) Handover (HO) procedure includes sending, by a gNB-Centralized Unit Control Plane (gNB-CU-CP) to a User Equipment directly or via a serving gNB-Distributed Units (gNB-DU), one or more Radio Resource Control (RRC) messages with LTM candidate cell configuration of one or more LTM candidate gNB-DUs, based on the one or more RRC messages, sending, by User Equipment or a serving gNB-DU, a Layer 1 (L1) Measurement Report to the one or more LTM candidate gNB-DUs, the L1 measurement report, receiving, at the one or more LTM candidate gNB-DUs, the L1 Measurement Report, in response to receiving the L1 Measurement Report, determining, by the one or more LTM candidate gNB-DUs, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more candidate gNB-DUs to acquire timing advance Uplink (UL) Synchronization, initiating, by the one or more LTM candidate gNB-DUs, reservation of partial or full radio resources for one of one or more LTM candidate cells for a LTM cell switch from the serving cell to the one of the one or more LTM candidate cells by the UE, sending, by the one or more LTM candidate gNB-DUs to a gNB-CU-CP, an updated LTM candidate cell configuration corresponding to the partial or full radio resources, and sending, by the gNB-CU-CP, the updated radio resource configuration for the one or more LTM candidate cells having the partial or full radio resources of the one or more LTM candidate cells to the UE via the serving gNB-DU.

Embodiments described herein provide method that provides one or more advantages. For example, configuration for LTM handover takes take place at the gNB-CU-CP, but LTM handover is executed autonomously by the gNB-DU without further interaction with the upper layers. The lead time duration between LTM HO preparation and execution is reduced and only target candidate cell configurations that end up in LTM serving cell changes are provided. The problem of slow data forwarding is eliminated and overhead in terms of processing and buffer occupancy is reduced.

FIG. 1 illustrates a disaggregated Radio Access Network (RAN) architecture 100 according to at least one embodiment.

In FIG. 1, UE 1 (User Equipment 1) 110, UE 2 112, UE 3 114, UE 4 116 access a mobile network via RAN 100. Radio Access Network 100 includes Radio Towers 120, 123, 125. Radio Towers 120, 123, 125 are associated with RU (Radio Unit) 1 122, RU 2 124, RU 3 126, respectively.

RU 1 122, RU 2 124, RU 3 126 handle the Digital Front End (DFE) and the parts of the PHY layer, as well as the digital beamforming functionality. RU 1 122 and RU 2 124 are associated with gNB-Distributed Unit (gNB-DU) 1 130, and RU 3 126 is associated with gNB-DU2 132. gNB-DU1 130 and gNB-DU2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data is moves across the physical network.

gNB-DU1 130 is coupled to the RU 1 122 via Fronthaul connection 150, and to RU 2 124 via Fronthaul connection 152. gNB-DU2 132 is coupled to RU 3 126 via Fronthaul connection 154. gNB-DU1 130 and gNB-DU2 132 run the Radio Link Control (RLC), MAC, and parts of the Physical (PHY) layer. gNB-DU1 130 and gNB-DU2 132 include a subset of the eNB/gNB functions, depending on the functional split option, and operation of gNB-DU1 130 and gNB-DU2 132 are controlled by Centralized Unit (CU) 140. gNB-CU 140 is responsible for non-real time, higher L2 and L3. Server and relevant software for gNB-CU 140 is able to be hosted at a site or is able to be hosted in an edge cloud (datacenter or central office) depending on transport availability and the interface for the Fronthaul connections 150, 152, 154. The server and relevant software of gNB-CU 140 is also able to be co-located at gNB-DU1 130 or gNB-DU2 132, or is able to be hosted in a regional cloud data center.

The gNB-CU 140 handles the RRC and PDCP layers. gNB-CU 140 includes a gNB-CU-Control Plane (CU-CP) 142 and one or more gNB-CU-User Planes (CU-UP) 144, respectively. gNB-CU-CP 142 is a logical node hosting the RRC and the control plane part of the PDCP protocol of the gNB-CU 140 for gNB 100. A gNB-CU-UP 144 is a logical node hosting the user plane part of the PDCP protocol of the gNB-CU 140, and the user plane part of the PDCP protocol and the SDAP protocol of the gNB-CU 142. gNB-DU1 130, and gNB-DU1 132 are connected to gNB-CU-CP 142 via F1-C 160, and gNB-DU1 130, and gNB-DU1 132 are connected to one or more gNB-CU-UP via F1-U 162 interfaces. The split architecture enables a 5G network to utilize different distribution of protocol stacks between gNB-CU 140, and gNB-DU1 130 and gNB-DU2 132, depending on network design and availability of the Midhaul connection 156. gNB-CU-CP 142 is coupled to one or more gNB-CU-UP 144 via one or more E1 interfaces 170.

In FIG. 1, two connections are shown between gNB-CU 140 and gNB-DU1 130 and gNB-DU2 132. gNB-CU 140 is able to implement additional connections to other gNB-DUs (not shown). gNB-CU 140, in 5G, is able to implement, for example, 256 endpoints or gNB-DUs. gNB-CU 140 supports the gNB functions such as transfer of user data, mobility control, RAN sharing (MORAN), positioning, session management, etc. However, one or more functions are able to be allocated to gNB-DU1 130 and gNB-DU2 132. gNB-CU 140 controls the operation of gNB-DU1 130 and gNB-DU2 132 over the Midhaul interface 156.

Layer 1/Layer 2 (L1)/L2 Triggered Mobility (LTM) enables a serving cell change via L1/L2 signaling, while keeping configuration of the upper layers and/or minimizing changes of configuration of the lower layers. LTM helps to reduce the latency, overhead and interruption time during handover. In at least one embodiment, gNB-DU1 130 is a serving gNB-DU for UE 3 114, while gNB-DU2 is a candidate gNB-DU for handover for UE 3 114.

Figure 2:
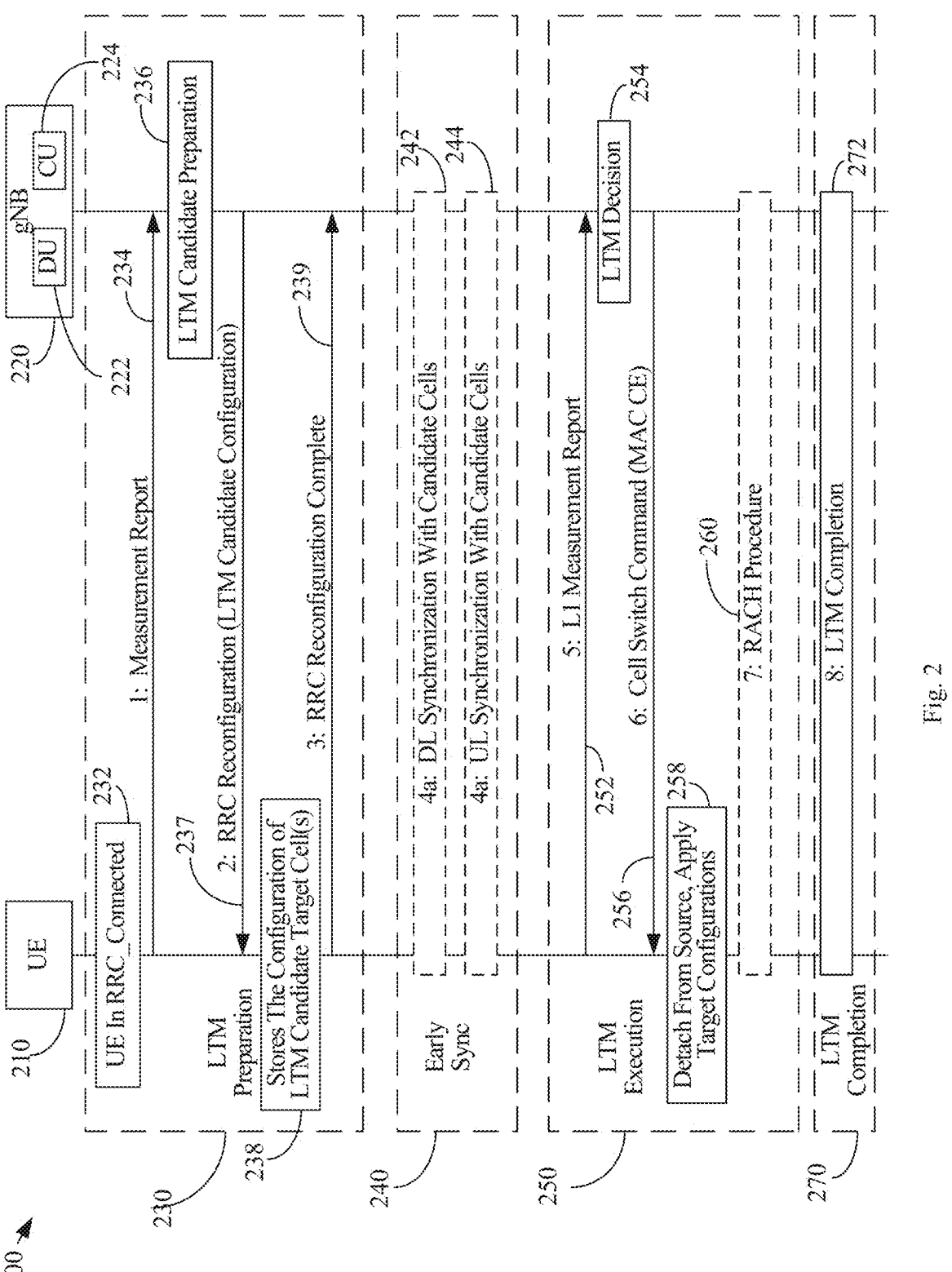
FIG. 2 illustrate the overall procedure for LTM according to at least one embodiment.

FIG. 2 illustrate the overall procedure for LTM 200 according to at least one embodiment.

In FIG. 2, a UE 210 and gNB 220 are shown. The gNB 220 includes one or more gNB-DUs 222 and CU 224. Mobility enhancement 3rd Generation Partnership Project (3GPP) Release 18, RP-213565 specifics mechanisms and procedures of L1/L2 based inter-cell mobility for mobility latency reduction. L1/L2 based inter-cell mobility is applicable to standalone, Carrier Aggregation (CA) and New Radio-Dual Connectivity (NR-DC) case with serving cell change within one Cell Group (CG), intra-DU case and intra-CU inter-DU case (applicable for Standalone and CA: no new Radio Access Network (RAN) interfaces are expected), intra-frequency and inter-frequency, and Frequency Range One (FR1) and FR2 Source and Target cells are able to be synchronized or non-synchronized.

As used herein, a candidate cell is a cell that is prepared for future execution of mobility or handover. A target cell is an LTM candidate cell that is selected for LTM serving cell change or handover. Thus, candidate cell (c) and target cell(s) are used interchangeably, and according to embodiments described herein, candidate cell and target cell are used as common terminology. Also, handover and serving cell change are used interchangeably in embodiment described herein. Thus, LDM Handover or LDM Serving cell change have the same meaning as used herein. The serving gNB is a cell that the UE 210 is using for service and which the UE 210 has a radio link to the serving cell. The corresponding gNB-DU associated with that cell is called the serving gNB-DU 222. Information of which cells that are configured as LTM Candidate cells are provided to the serving gNB-DU 222 as well as to the UE 210.

In FIG. 2, the first phase is the LTM preparation 230. The UE 210 is in RRC_Connected state 232. UE 210 sends a L3 Measurement Report message 234 to the gNB 220. In FIG. 2, the CU 224 and gNB-DU 222 are shown as part of the same gNB 220. UE 210 is configured to report L3 measurements for the candidate cells. The UE 210 keeps reporting these L3 measurements on an event/periodic basis to the serving gNB-CU 224 and based on these L3 measurements, the gNB-CU 224 prepares one or more LTM candidate cells and the candidate cell configuration is sent to the UE 210. The UE 210 is also configured to perform UL and DL sync with the candidate cells and periodically send L1 measurement reports 234 to the gNB-DU 222. Based on the received L1 measurement reports 234, the gNB-DU 222 decides regarding the LTM serving cell based on a time and a threshold at which the UE 210 is to be handed over to one of the other candidate cells, which then becomes the target cell. The candidate cell is able to be in the same gNB-DU 222, or in another gNB-DU (not shown) of the same gNB 220. However, a candidate cell is not able to be outside the gNB 220, because the LTM functionality is limited to one gNB in 3GPP Release 18. For intra-gNB cells, L3 mobility procedures are used.

A maximum of 8 candidate cells are described herein, which is the maximum number that can be configured per UE. However, the number is able to be extended in the future. Thus, the UE 210 is able to be configured with 8 candidate cells out of which one candidate cell is able to be chosen as a target cell. The target cell is chosen by the serving gNB-DU 222 based on the event/periodic L1 measurements reports 234 that are received from the UE 210.

After receiving the L3 measurement report 234, the gNB 220 decides to use LTM and initiates LTM candidate preparation 236, e.g., the gNB 220 prepares one or multiple candidate cells. This includes the CU 224 sending the gNB-DU 222 an F1 message, and the gNB-DU 222 responding with the candidate cell configuration.

The gNB 220 transmits an RRC reconfiguration message 237 to the UE 210 including the configuration of one or multiple LTM candidate target cells.

The UE 210 stores the configuration of LTM candidate target cell(s) 238 and transmits a RRC Reconfiguration Complete message 239 to the gNB 220 to acknowledge the RRC configuration has been completed.

Early Synchronization 240 is able to be performed using Downlink (DL) synchronization and Timing Advance (TA) acquisition with candidate cells 242 and Uplink (UL) synchronization and TA acquisition with candidate cells 244 while the UE 210 is still connected to the current serving cell. DL synchronization for candidate cell(s) 242 before cell switch command is supported at least based on SSB. TA acquisition of candidate cell(s) before LTM cell switch command is supported, at least based on PDCCH ordered RACH, where the PDCCH order is triggered by a source cell.

After that, LTM cell switch Execution 250 is executed. The UE 210 performs L1 measurements on the configured LTM candidate target cell(s), and transmits lower-layer (L1) measurement reports 252 to the gNB 220. The L1 measurement report 252 is provided to the gNB-DU 222. To realize CFRA, the PRACH preamble is reserved for a target cell. There is a discussion in RAN1 regarding the sending of UE/event triggered L1 measurement report 252 to one or more candidate cell(s). Within the 3GPP Technical Specification Group Radio Access Network (TSG RAN), RAN Working Group 1 (WG1) (RAN1) is responsible for the development of specifications dealing with evolved UMTS Terrestrial Radio Access (UTRA), 5G New Radio (NR), and beyond. RAN1 is responsible for specification of the physical layer of the radio Interfaces for UE, Evolved UTRAN, Next Generation Radio Access Network (NG-RAN), and beyond. The L1 measurement report 252 identifies a report destination indicating whether the report is sent to a serving cell or is sent to one or more candidate cell(s).

For the UE 210 to send to a candidate cell is slightly complex in nature because the UE 210 is not connected to the candidate gNB-DU and needs an UL grant from the candidate gNB-DU. The UL grant is easily provided by the serving cell 220 to the UE 210 based on a scheduling request message from the UE 210. This is why RAN1 made this agreement regarding whether or not to report L1 measurement report 252 to the candidate gNB-DU.

L1 measurement reports 252 for 3rd Generation Partnership Project (3GPP) Release 18 LTM are sent to the serving cell 220 unless the UE 210 is in 3GPP Release 17 Inter-Cell Beam Management (ICBM) operation. Beam Level Mobility does not rely on explicit RRC signaling to be triggered. Beam level mobility can be within a cell, or between cells, the latter is referred to as inter-cell beam management (ICBM). With ICBM operation, UE-dedicated signals/channels are transmitted/received via a non-serving cell. In this case, the L1 measurement report 252 is able to be sent to the non-serving cell or to the candidate cells.

To report to a LTM candidate cell in response to the LTM candidate cell not being an ICBM non-serving cell, the network provides the services of a neighboring cell to the UE 210. For example, UE Serving cell 220 is cell 1 and cell 2 is one of the candidate cells. Because there is no resource available in serving cell 1, the network lends resources of cell 2 to cell 1. In such cases, the UE 210 is able to send the L1 measurement report to cell 2 even though the serving cell 220 is still cell 1.

In the in this case, inter-cell beam management is not assumed, but, e.g., cell 1 is the serving cell and cell 2 is the candidate cell. Reporting to a LTM candidate in response to cell 1 not being an ICBM non-serving cell is based on inter-cell or gNB-DU coordination to make the measurement results available at the serving cell and also reservation of UL resources at the candidate cell for the reports to be sent by the UE 210. However, the lead time, which is the duration between LTM HO preparation and execution, is significant.

Then, the gNB 220 makes an LTM Decision 254 to select one of the candidate configurations at a target configuration for LTM, initiates LTM cell switch to the target cell by transmitting a MAC CE message 256 that includes an LTM cell switch command that includes the candidate configuration index of the target cell.

After receiving the MAC CE 256, the UE 210 detaches from the serving cell and applies the target cell configuration 258 to switch to the configuration of the LTM candidate/target cell. The candidate cell configurations is able to be added, modified, or released by the network via RRC signaling.

An optional RACH procedure 260 is performed (as indicated by dotted line). For example, a RACH procedure is used in response to the TA not being available. If the target cell TA is available, a RACH-less HO procedure is able to be performed. Thus, LTM HO procedures are able to not use the RACH procedure 260. During HO, the UE 210 waits for PRACH occasion and performs RACH operation 260 to synchronize with the UL of the target cell. For example, the TA of the target cell is able to be different from that of the serving cell. During the RACH procedure, the UE acquires the TA of the UE 210 at the target cell. The TA is UE-specific and could be different for different UEs in a cell.

Once the LTM Execution 250 has completed and the UE 210 successfully completes the LTM cell switch towards the target cell, LTM Completion stage 270 is initiated. An RRC Reconfiguration Complete message 272 is sent from UE 210 to the gNB 220. The RRC Reconfiguration Complete message 272 indicates that the RRC Reconfiguration that was sent earlier has been successfully applied. Subsequent LTM is performed by repeating the Early Synchronization 240, LTM execution 250, and LTM completion 270 without releasing other candidates after LTM completion.

However, the lead time, e.g., the duration between LTM HO preparation and execution, is able to be significant. Secondly, not all target candidate cell configurations result in LTM serving cell changes. This means that in response to there being 8 cells prepared for a UE 210, the UE may not go to the 8 cells. Hence resource reservation, including PRACH preambles, is going to be an issue in the legacy baseline and our L3 Mobility.

In the legacy baseline NR L3 mobility, the UE 210 obtains the Timing Advance (TA) towards the target cell and completes the UL synchronization via the RACH procedure. Contention Free Random Access (CFRA) involves a 4-step RACH process and Contention Based Random Access (CBRA) involves a 2-step RACH process. The UE 210 is able to complete the RACH procedure in two steps (Msg1+ Msg2 or MsgA+MsgB), which is faster than CBRA in 4-step RACH (Msg1 to Msg4). However, even with the CFRA in 4-step RACH or CBRA in 2-step RACH, the UE 210 waits for the available periods, e.g., PRACH occasions, and then send the preamble and waits for the Random Access Response (RAR). The MAC layer of the gNB 220 generates the RAR as a response to the Random Access Preamble transmitted by the UE 210. The time for the RACH procedure is around 10 to 20 milliseconds.

RACH-less solutions are used to reduce the interruption time during handover. Two RACH-less solutions have been agreed to: in response to the TA of the target cell being equal to 0, and in response to the target cell having the same TA as the source cell. Thus, the TA is used for cells to operate properly without causing interference. If cells in the neighborhood have the same timing advance, then interference occurs, and the cells create more noise than signal.

For that reason, the timing advances in cells are different, and the UE 210 procures the timing advance of the target cell in order to perform RACH-less HO.

However, a first issue exists because RACH-less HO is sometimes not feasible, e.g., RACH-less HO is not feasible in response to the TA acquired from the candidate/target cell being expired or not valid. RACH-less HO is not possible in response to the TA of the candidate/target cell not being able to be acquired.

A second issue involves data forwarding. Currently, data forwarding is slow and also involves considerable overhead. Data forwarding to multiple candidate/target cells, e.g., 8 cells, is expensive in terms of processing and buffer occupancy. Data forwarding to 8 cells is not optimal because the cells are candidate cells, and a check is made whether the data has been successfully transmitted and then deleted. Another issue associated with serving gNB-DU triggering the data forwarding from the gNB-CU-CP implies that the serving gNB-DU needs to be aware of the topology of gNB-CU-UP to gNB-DU association. This is required to determine if the gNB-CU-UP can perform data forwarding to a candidate gNB-DU.

Figure 3:
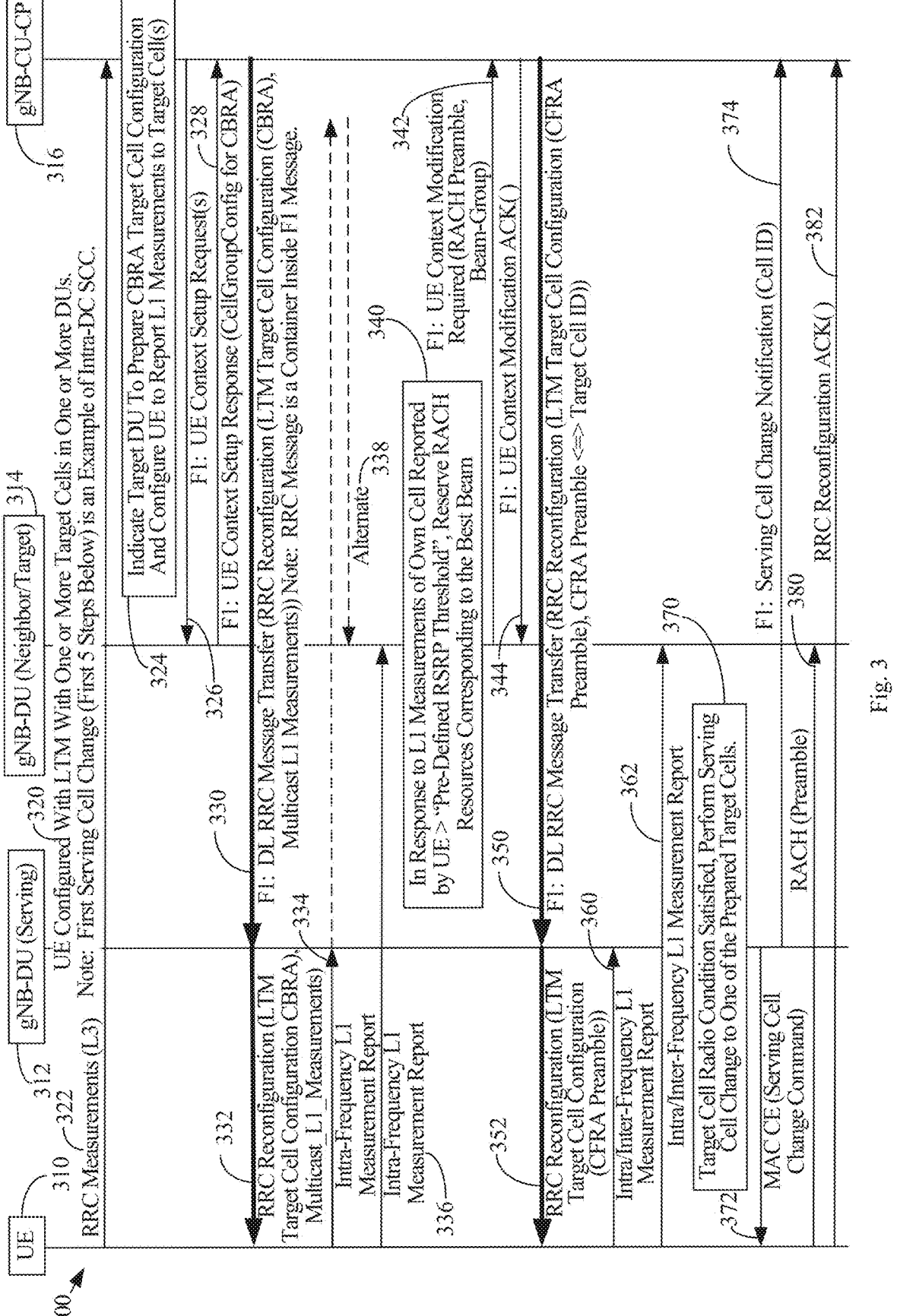
FIG. 3 is a flow diagram of delayed Random-Access CHannel (RACH) resource reservation at the target Distributed Unit (DU) according to at least one embodiment.

FIG. 3 is a flow diagram 300 of delayed Random-Access CHannel (RACH) resource reservation at the target Distributed Unit (DU) according to at least one embodiment.

In FIG. 3, User Equipment (UE) 310 is configured with a Layer 1-Layer 2 (L1/L2) Triggered Mobility (LTM) 320 with one or more candidate/target cells 314 having one or more gNB-DUs. RACH resource reservation involves resources used for a UE to perform Contention Free RACH Access (PRACH resources for UE dedicated RACH as the network side, RACH preamble ID). Radio Resource Control (RRC) measurements (L3) 322 are sent by the UE 310 to the gNB-CU-Control Plane (gNB-CU-CP) 316. The gNB-CU-CP 316 uses the RRC measurements (L3) 322 to determine 324 a Target gNB-DU for preparing Contention-Based Random Access (CBRA) Target Cell Configuration and the configuration for UE 310 to report L1 Measurements to the Target cells 314.

At the time of preparing an LTM target cell, the target gNB-DU 314 may not reserve a RACH preamble in the candidate/target cell configuration or the RACH preamble allocated at the time of candidate/target cell preparation may not be valid at the time of LTM cell switch execution. So when the candidate/target cell configuration is being sent to the UE 310, the target gNB-DU 314 may not perform reservation of the RACH resources. Other RRM resources may also be scarce and may not be reserved at the time of candidate/target cell preparation as it will be blocked for the entire duration of "lead time", i.e., duration between preparation and execution of LTM cell switch. This may be indicated using a new Information Element (IE) by the gNB-CU-CP 316 in the UE Context Setup Request message 326 and the UE Context Setup Response message 328 with the CellGroupConfiguration for CBRA via the F1 interface.

The gNB-CU-CP 316 sends a F1: DL RRC Message Transfer 330 to the Serving gNB-DU 312. The Serving gNB-DU 312 sends an RRC Reconfiguration message 332 to the UE 332. The RRC connection reconfiguration procedure is used to establish, modify or release radio bearers. When the gNB-CU-CP 316 is sending or performing this target cell preparation or requesting the target cell preparation, the gNB-CU-CP 316 indicates that RACH resources reservation for this cell is not performed.

Based on the RRC Reconfiguration message 332, UE 310 sends an event-based L1 measurement report 334 sent to the Target gNB-DU 314. The L1 measurement report 336 is able to be sent from the UE 310 to the Target gNB-DU 314 directly, e.g., in response to UL resources being reserved at the target cell or in response to Multiple Transmission And Reception Point (mTRP) transmission being configured for the UE 310. Alternatively, the UE 310 is able to send the event-based L1 measurement report 334 to the Serving gNB-DU 312, wherein the serving gNB-DU 312 sends the event-based L1 measurement report 338 to the CU 316, which forward the event-based L1 measurement report 338 to the candidate/target gNB-DU 314.

The L1 measurement report 334/336, 336 of the UE 310 is able to include a pre-configured L1 RSRP threshold value. Based on the event-based L1 measurement report 334/338, 336 of the UE 310 being received at the target gNB-DU 314 along with the pre-configured L1 RSRP threshold value, the candidate/target gNB-DU 314 determines whether a radio condition of one of the one or more LTM candidate gNB-DUs meets a predetermined resource reservation criteria, e.g., a predetermined Reference Signal Receive Power (RSRP) Threshold 340. RSRP is the average received power of a RS resource element. The candidate/target gNB-DU 314 also reserves RACH resources 340, including a RACH preamble, corresponding to the best beam/beam group for the UE 310. Here, the solution mentioned in the RAN1 agreement is used where the event based L1 measurements reports 336 are provided to the Target gNB-DU 314 also, or forwarded 338 to the Target gNB-DU 314.

On the contrary, if the RACH preamble is allocated to the UE 310 during the candidate/target cell preparation, this could be indicated by the candidate/target gNB-DU 314 to the gNB-CU 316 and by the gNB-CU 316 to the serving gNB-DU 312 in the F1 messages. The serving gNB-DU 312 may determine whether or not to issue a PDCCH order to the UE 310 to perform Uplink (UL) Synchronization with the candidate cell and acquire Timing Advance (TA) of the candidate cell. The serving gNB-DU 312 may set an RRM criteria (e.g., RSRP threshold) to determine when to issue the PDCCH order to the UE 310. The UE 310 performing Uplink (UL) Synchronization, i.e., sending the Random-Access CHannel (RACH) request message to acquire TA of the candidate cell could be considered by the target gNB-DU 314 as a trigger to reserve the remaining RRM resources, as the UE 310 may be considered very close to performing an LTM cell switch to the said candidate cell.

The UE 310 is able to undergo mobility inside the Serving gNB-DU 312, after the LTM Target gNB-DU 314 preparation is performed, which may alter the best beam/beam group corresponding to the UE 310 at the Target gNB-DU 314. This leads to 2 issues: a) sub optimal resource reservation with respect to RACH resources, and b) unnecessary blocking of resources for a longer duration in case of lead times. The pre-configured L1 threshold used as a resource reservation criteria is thus indicated to gNB-DUs 312, 314 and gNB-CU-CP 316. The pre-configured L1 threshold is also able to be based on LTM handover criteria at the Serving gNB-DU 312 to the Target gNB-DU 314.

Based on the radio condition of the one or more LTM candidate gNB-DUs 314 meeting the predetermined resource reservation criteria as per the L1 measurement report or UE performing a RACH procedure to acquire candidate cell TA, one or more LTM candidate gNB-DUs 314 initiate reservation of partial or full radio resources for one of one or more LTM candidate cells for a LTM cell switch of the UE 310 from the serving gNB-DU 312 to the one of the one or more LTM candidate cells, i.e., Candidate/ Target gNB-DU 314. Based on the received L1 measurement report 336, 338, the Target gNB-DU 314 allocates RACH resources including RACH preamble to the UE 310 according to the best beam/beam-group of the UE 310. Since the RACH resource allocation is performed closer to the Serving Cell 312 change, and based on radio conditions (based on the Pre-defined RSRP Threshold), the allocation of RACH resources by the Target gNB-DU 314 is more appropriate and resource reservation is for a shorter duration. Any other RRM resource that may not have been reserved at the time of candidate cell preparation could be reserved now.

The RACH resources and other RRM resources reserved at the Target gNB-DU 314, 336 is sent from Target gNB-DU 314 to the gNB-CU-CP 316 using the UE Context Modification Required message 342 via the F1 interface, or using any other similar procedure. The gNB-CU-CP 316 responds with an UE Context Modification Acknowledgement (ACK) message 344.

The gNB-CU-CP 316 sends the Serving gNB-DU 312 a Downlink (DL) RRC message 350 via an F1 interface. The DL RRC message 350 includes updated radio resource configuration of the candidate/target cell having the reserved partial or full radio resources of the one or more LTM candidate/target cells 314. For example, the F1: DL RRC message 350 is able to include LTM Target Cell Configuration (CFRA Preamble) and Target cell identification as an F1 protocol information. The information provided in the DL RRC Message Transfer message 350 is also used at the Serving gNB-DU 312. The delayed resource reservation is applicable not just for the RACH resources, but also other RRM resources, such as UL PUCCH configuration, etc.

The Serving gNB-DU 312 sends to the UE 310 an RRC Reconfiguration message 352. The RRC Reconfiguration message 352 provides the UE the LTM Target Cell Configuration including the CFRA Preamble.

The UE 310 sends Intra/Inter-Frequency L1 Measurement Report 360 to the Serving gNB-DU 312. The UE 310 also sends Intra/Inter-Frequency L1 Measurement Report 362 to the Target gNB-DU 314. Based on the radio condition of the Target gNB-DU 314 being satisfied, i.e., radio condition being greater than the pre-defined RSRP Threshold, an LTM cell switch is made 370 from the Serving gNB-DU 312 to the prepared Target gNB-DU 314.

The Serving gNB-DU 312 sends the UE 310 a MAC CE command 372 (Serving Cell Change Command). The Serving gNB-DU 312 sends the gNB-CU-CP 316 a Serving Cell Change Notification (Cell ID) 374. The UE 310 performs a RACH operation 380 using a RACH preamble that is provided to the Target gNB-DU 314. Then, the UE 310 sends a RRC Reconfiguration Acknowledgement (ACK) 382 to the gNB-CU-CP 316.

Figure 4:
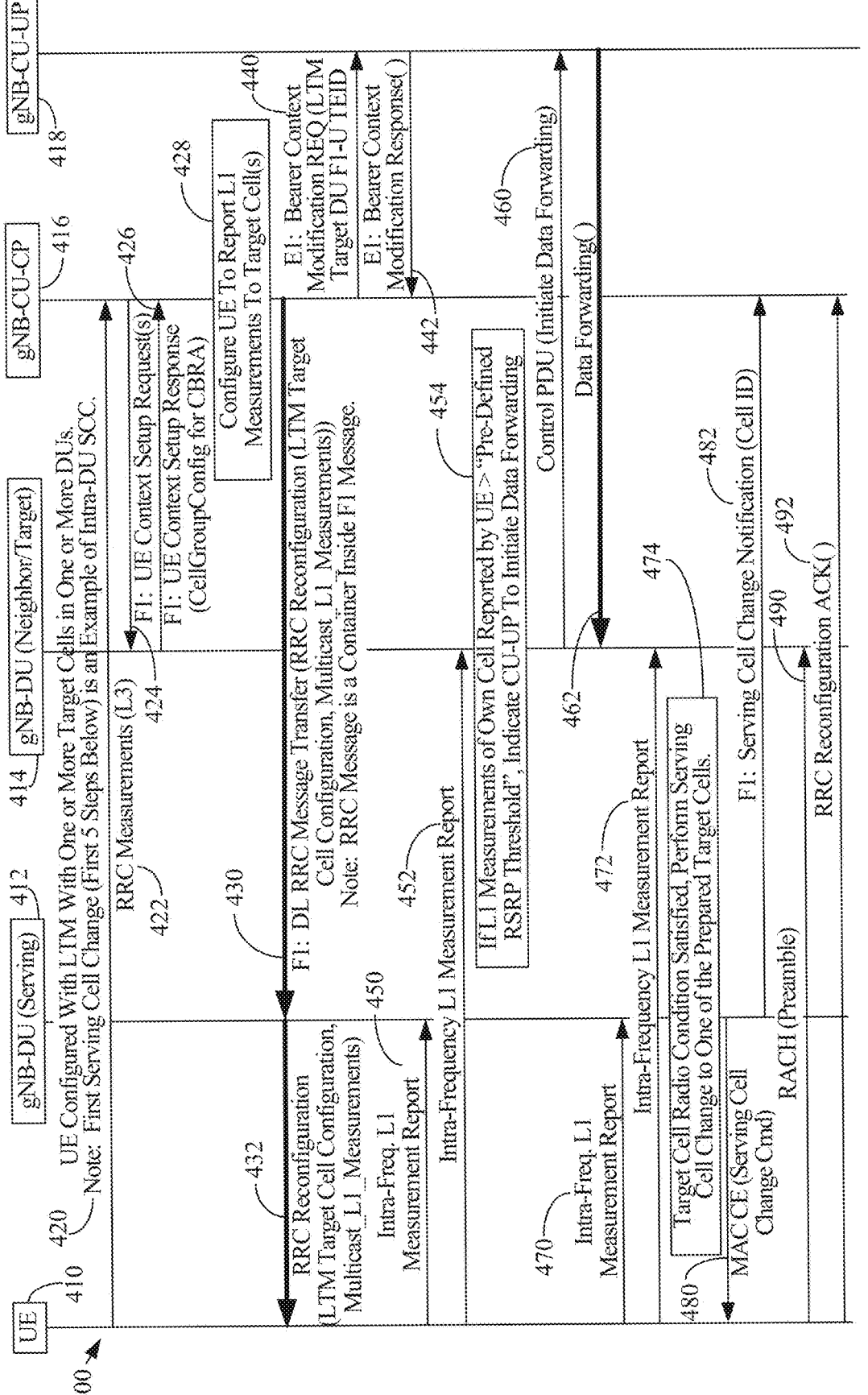
FIG. 4 is a flow diagram of optimized data forwarding according to at least one embodiment.

FIG. 4 is a flow diagram 400 of optimized data forwarding according to at least one embodiment.

In FIG. 4, a UE 410 is configured 420 with LTM with one or more target cells 414 having one or more gNB-DUs. UE 410 is connected with Serving gNB-DU 412. FIG. 4 also shows operation gNB-CU-CP 416 and gNB-CU-UP 418. Data forwarding initiated before the LTM serving gNB-DU 412 change, e.g., after the Target Cell 414 is prepared, is early data forwarding and causes a significant overhead in terms of processing load and memory usage at the target gNB-DU 414. Data forwarding started after LTM serving cell change notification from the Serving gNB-DU 412 to the gNB-CU-UP 418 (towards the Target gNB-DU 414) is late data forwarding and is capable of being sub optimal because of additional latency.

UE 410 sends a RRC Measurement Report (L3) 422 to the gNB-CU-CP 416. gNB-CU-CP 416 sends UE Context Setup Request 424 to Target gNB-DU 414. Target gNB-DU 414 responds with UE Context Setup Response with Cell Group Configuration for CBRA 426 that is sent to gNB-CU-CP 416.

The gNB-CU-CP 416 configures UE L1 Measurement Reports 428 to be sent by UE 410 to the Target Cell(s) 414. gNB-CU-CP 416 sends DL RRC Message Transfer 430 to Serving gNB-DU 412 via an F1 interface. DL RRC Message Transfer 430 includes LTM Target Cell Configuration, and Multicast L1 Measurements. Serving gNB-DU 412 sends RRC Reconfiguration message 432 to UE 410 to provide UE 410 the LTM Target Cell Configuration, and the Multicast L1 Measurements. The RRC connection reconfiguration procedure is used to establish, modify or release radio bearers.

The gNB-CU-CP 416 sends gNB-CU-UP 418 a Bearer Context Modification Request 440 via an E1 interface. Bearer Context Modification Request 440 is used to establish the bearer context in the gNB-CU-UP 418. The Bearer Context Modification Request 440 includes the F1-U Tunnel Endpoint Identifier (TEID) of LTM Target gNB-DU 414. The gNB-CU-UP 418 sends the E1 Bearer Context Modification Response message 442 to gNB-CU-CP 416, including F1-U UL TEID and transport layer address allocated by the gNB-CU-UP 418.

UE 410 begins sending the Serving gNB-DU 412 an Intra-Frequency Measurement Report 450. UE 410 also sends the Target gNB-DU 414 an Intra-Frequency Measurement Report 452. The Target gNB-DU 414 determines whether the L1 Measurements reported by the UE 310 are greater than a predetermined resource reservation criteria, e.g., a pre-defined RSRP Threshold 454. In response to the L1 Measurements reported by the UE 310 being greater than the predetermined resource reservation criteria, the Target gNB-DU 414 indicates to the gNB-CU-UP 418 to initiate Data Forwarding. At least one embodiment as illustrated in FIG. 4 uses Optimized Early Data Forwarding based on the received event based L1 measurement report and a pre-configured L1 RSRP Threshold value where the candidate/ target gNB-DU 414 triggers a control PDU 460 or a signaling message via F1/E1 towards the gNB-CU-UP (PDCP host) 418 to initiate data forwarding to the Target gNB-DU 414. A Control PDU is a data packet that is intended to include control information. The Control PDU is a data PDU that is able to be sent to gNB-CU-UP 418 from the Target gNB-DU 414 over the F1-U interface. A control signaling message, i.e., a control plane message, is sent by the Target gNB-DU 414 to gNB-CU-CP 416 over F1, which will be further forwarded to the gNB-CU-UP 418 over the E1 interface because there is not a direct control plane interface between the Target gNB-DU 414 and the gNB-CU-UP 418. The Pre-configured L1 threshold is able to be derived based on LTM HO criteria at the Serving gNB-DU 412. This could be indicated to the Target gNB-DU 414 by the gNB-CU-CP 416.

Thus, Data Forwarding 462 is performed based on the radio condition, and just before the serving cell change has taken place. Data Forwarding 462 is thus started closer to the LTM Handover, and the UE 410 is most likely to come to this cell because the pre-configured L1 threshold is used as a benchmark indicating that the UE 410 is reporting the Target gNB-DU 414 at an acceptable level. Then is Data Forwarding 462 performed and overhead is avoided. Hence, buffer space is not wasted at the Target gNB-DU 414 and the Data Forwarding 462 is not delayed. Another advantage is that since the Data Forwarding 462 is initiated based on radio condition, the Data Forwarding 462 is not performed towards Candidate gNB-DUs, and only the Target gNB-DU 414 that satisfies the radio condition receives the forwarded data. Even in this case there is a possibility that the handover is able to not happen and the UE remains with the Serving gNB-DU 412, or the UE 410 is able to go to another cell. But the chances are limited or reduced because the Data Forwarding 462 is based on radio conditions and not just configuration.

The Optimized Early Data Forwarding 462 is also able to be initiated by the Serving gNB-DU 412 based on received L1 measurements 450. The Serving gNB-DU 412 has to be notified of the association between the target gNB-DUs and their corresponding gNB-CU-UP 418 (e.g., addresses). This starts to get more complicated during a relocation scenario for the gNB-CU-UP 418. According to at least one embodiment described herein, such complications are avoided.

In response to the Target gNB-DU 414 determining that the radio condition of the one of the one or more LTM candidate gNB-DUs drops below the predetermined resource reservation criteria, the Target gNB-DU 414 sends a Control PDU 460 to the gNB-CU-UP 418 to instruct the gNB-CU-UP 418 to stop forwarding of data to the one of the one or more LTM candidate gNB-DUs 414.

Intra-Frequency Measurement Reports 470 are sent form the UE 410 to the Serving gNB-DU 412. Intra-Frequency Measurement Reports 472 are also sent form the UE 410 to the Target gNB-DU 414. The Serving gNB-DU 412 determines 474 whether the radio condition of the Target Cell 414 is satisfied. In response to the radio condition of the Target Cell 414 being satisfied, LTM cell switch is perform to a prepare target cell, e.g., Target gNB-DU 414.

Serving gNB-DU 412 sends the UE 410 a MAC CE 480 with the serving cell change command. The Serving gNB-DU 412 also sends the gNB-CU-CP 416 a Serving Cell Change Notification message 482. The Serving Cell Change Notification message 482 includes the Cell ID of the Target gNB-DU 414.

Still TA alignment is able to be missing. The UE performs a RACH process to obtain the TA by sending a RACH message with the RACH preamble 490 to the Target gNB- DU 414. The RACH message is to be used while the serving cell change is being performed by the UE 410. In such scenarios, the forwarded L1 Measurements Report 470, 472 will be useful. UE 410 sends a RRC Reconfiguration Acknowledgement (ACK) 392 to the gNB-CU-CP 416.

In response to the L1 Measurement Reports being directly sent to Target gNB-DU 414, the Target gNB-DU 414 is able to be configured to reserve certain radio resources for reception of the L1 Measurement Report 472 received from the UE 410. Such radio resources are able to be configured in semi-static or an on-demand basis, and are able to be UE-dedicated or non-UE-dedicated resources.

Another applicable scenario is in response to a UE 410 being configured with Multiple Transmission and Reception Point (mTRP) transmission and the non-serving cell of the mTRP transmission is a LTM Target gNB-DU 414. Since the UE 410 has a radio link to the Serving gNB-DU 412 and non-serving cells, Target gNB-DU 414, in mTRP configuration, event based L1 Measurements Reports 452 are able to be sent to the Target gNB-DU 414 directly. However, Data Forwarding 462 according to at least one embodiment is not targeted towards ICBM (Inter Cell Beam Management) scenario, where a RACH is not able to be performed.

In FIGS. 3-4, delayed resource reservation is specifically suggested for CFRA preamble, but delayed resource reservation according to at least one embodiment are applicable for any other resource as well. For example, other resources which are to be used or which have a shortage in the Target gNB-DU 414 is applicable, and hence are able to be reserved with a delayed resource reservation. A gNB-Centralized Unit User Plane (gNB-CU-CP) sends Radio Resource Control (RRC) messages with LTM candidate cell configuration of LTM candidate gNB-DUs. Based on the RRC messages, a Layer (L1) Measurement Report is sent to the LTM candidate gNB-DUs. In response, the LTM candidate gNB-DUs determine whether a radio condition of the LTM candidate gNB-DUs meet a predetermined resource reservation criteria. Based on meeting the predetermined resource reservation criteria, the LTM candidate gNB-DUs initiate reservation of radio resources for an LTM candidate cell for a LTM cell switch. The LTM candidate gNB-DUs send to the gNB-CU-CP an updated LTM candidate cell configuration. The gNB-CU-CP sends the updated radio resource configuration to the UE via the serving gNB-DU.

Figure 5:
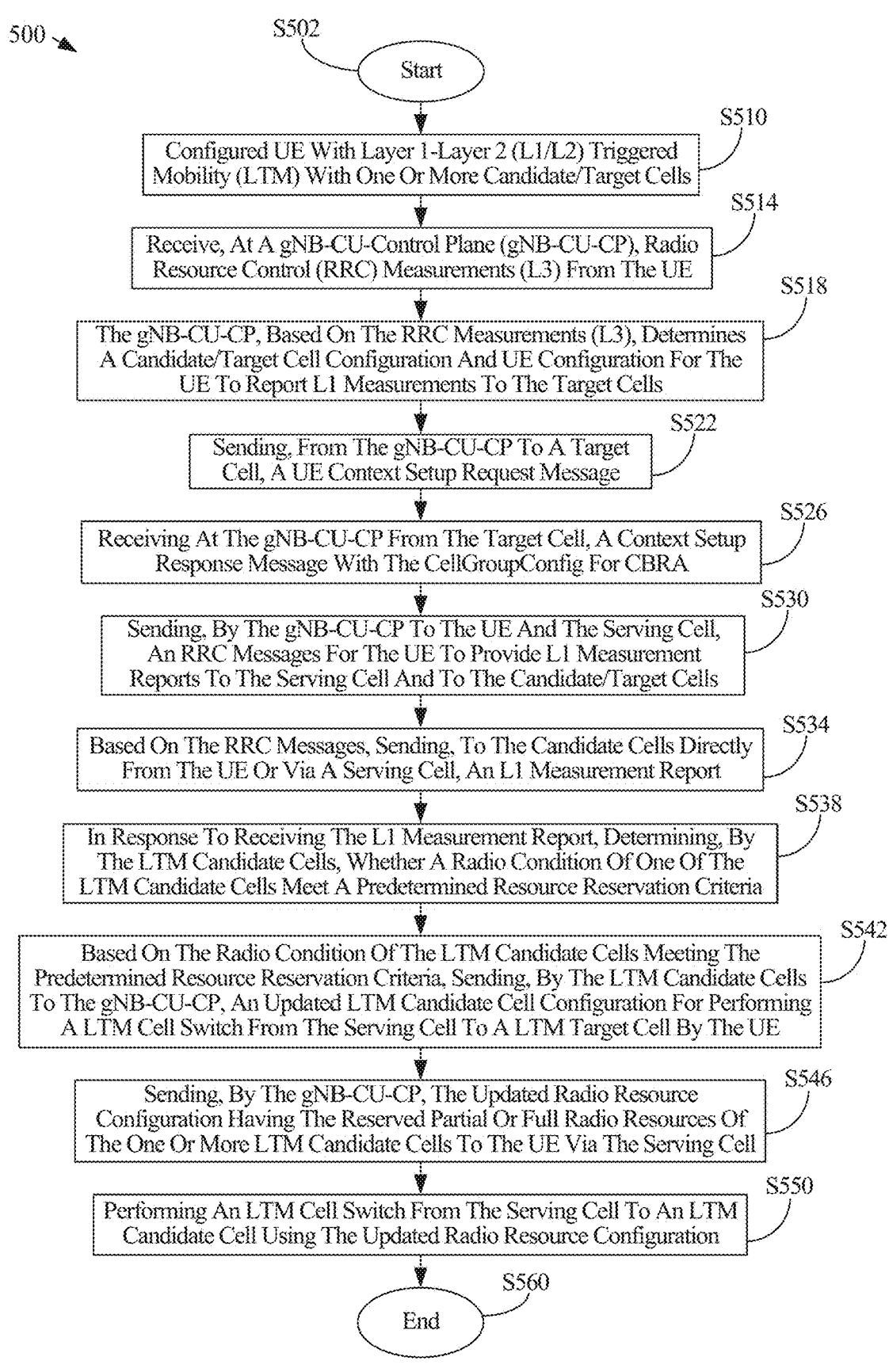
FIG. 5 is a flowchart of a method for providing enhancements for Lower-Level Triggered Mobile (LTM) Handover (HO) according to at least one embodiment.

FIG. 5 is a flowchart 500 of a method for providing enhancements for Lower-Level Triggered Mobile (LTM) Handover (HO) according to at least one embodiment.

In FIG. 5, the process starts S502, and a UE is configured with Layer 1-Layer 2 (L1/L2) Triggered Mobility (LTM) with one or more candidate/target cells S510. Referring to FIG. 3, User Equipment (UE) 310 is configured with a Layer 1-Layer 2 (L1/L2) Triggered Mobility (LTM) 320 with one or more candidate/target cells 314 having one or more gNB-DUs. RACH resource reservation involves resources used for a UE to perform Contention Free RACH Access (PRACH resources for UE dedicated RACH as the network side, RACH preamble ID).

At a gNB-CU-Control Plane (gNB-CU-CP), Radio Resource Control (RRC) measurements (L3) are received from the UE S514. Referring to FIG. 3, Radio Resource Control (RRC) measurements (L3) 322 are sent by the UE 310 to the gNB-CU-Control Plane (gNB-CU-CP) 316.

The gNB-CU-CP, based on the RRC measurements (L3), determines a candidate/target cell Configuration and UE configuration for the UE to report L1 Measurements to the Target cells S518. Referring to FIG. 3, The gNB-CU-CP 316 uses the RRC measurements (L3) 322 to determine 324 a Target gNB-DU for preparing Contention-Based Random Access (CBRA) Target Cell Configuration and the configuration for UE 310 to report L1 Measurements to the Target cells 314.

A UE Context Setup request message is sent by the gNB-CU-CP to a Target cell S522. Referring to FIG. 3, at the time of preparing an LTM target cell, the target gNB-DU 314 does may not reserve a RACH preamble in the candidate/target cell configuration or the RACH preamble allocated at the time of candidate/target cell preparation may not be valid at the time of LTM cell switch execution. So when the candidate/target cell configuration is being sent to the UE 310, the target gNB-DU 314 does may not perform reservation of the RACH resources. Other RRM resources may also be scarce and may not be reserved at the time of candidate/target cell preparation as it will be blocked for the entire duration of "lead time", i.e., duration between preparation and execution of LTM cell switch. This may be indicated using a new Information Element (IE) by the gNB-CU-CP 316 in the UE Context Setup Request message 326 and the UE Context Setup Response message 328 with the CellGroupConfiguration for CBRA via the F1 interface.

A Context Setup Response message with the CellGroup-Configuration for CBRA is received at the gNB-CU-CP from the Target cell S526. Referring to FIG. 3, in response to the candidate/target cell configuration being sent to the UE 310, the target gNB-DU 314 does may not perform reservation of the RACH resources. Other RRM resources may also be scarce and may not be reserved at the time of candidate/target cell preparation as it will be blocked for the entire duration of "lead time", i.e., duration between preparation and execution of LTM cell switch. This may be indicated using a new Information Element (IE) by the gNB-CU-CP 316 in the UE Context Setup Request message 326 and the UE Context Setup Response message 328 with the CellGroupConfiguration for CBRA via the F1 interface.

RRC messages for the UE to provide L1 Measurement Reports to the Serving cell and to the candidate/target cells are sent by the gNB-CU-CP to the UE and the Serving cell S530. Referring to FIG. 3, the gNB-CU-CP 316 sends a F1: DL RRC Message Transfer 330 to the Serving gNB-DU 312. The Serving gNB-DU 312 sends an RRC Reconfiguration message 332 to the UE 332. The RRC connection reconfiguration procedure is used to establish, modify or release radio bearers. When the gNB-CU-CP 316 is sending or performing this target cell preparation or requesting the target cell preparation, the gNB-CU-CP 316 indicates that RACH resources reservation for this cell is not performed. Referring to FIG. 4, after the gNB-CU-CP 416 sends the DL RRC Message 430 to the Serving Cell 412 and the UE 410, the gNB-CU-CP 416 is also able to send gNB-CU-UP 418 a Bearer Context Modification Request 440 via an E1 interface. Bearer Context Modification Request 440 is used to establish the bearer context in the gNB-CU-UP 418. The Bearer Context Modification Request 440 includes the F1-U Tunnel Endpoint Identifier (TEID) of LTM Target gNB-DU 414. The gNB-CU-UP 418 sends the E1 Bearer Context Modification Response message 442 to gNB-CU-CP 416, including F1-U UL TEID and transport layer address allocated by the gNB-CU-UP 418.

Based on the RRC messages, sending, an L1 Measurement Report is sent to the candidate cells directly from the UE or via a serving cell S534. Referring to FIG. 3, based on the RRC Reconfiguration message 332, UE 310 sends an event-based L1 measurement report 334 sent to the Target gNB-DU 314. The L1 measurement report 336 is able to be sent from the UE 310 to the Target gNB-DU 314 directly, e.g., in response to UL resources being reserved at the target cell or in response to Multiple Transmission And Reception Point (mTRP) transmission being configured for the UE 310. Alternatively, the UE 310 is able to send the event-based L1 measurement report 334 to the Serving gNB-DU 312, wherein the serving gNB-DU 312 sends the event-based L1 measurement report 338 to the CU 316, which forward the event-based L1 measurement report 338 to the candidate/target gNB-DU 314.

In response to receiving the L1 Measurement Report, the LTM candidate cells determine whether a radio condition of one of the LTM candidate cells meet a predetermined resource reservation criteria S538. Referring to FIG. 3, the L1 measurement report 334/336, 336 of the UE 310 is able to include a pre-configured L1 RSRP threshold value. Based on the event-based L1 measurement report 334/338, 336 of the UE 310 being received at the target gNB-DU 314 along with the pre-configured L1 RSRP threshold value, the candidate/target gNB-DU 314 determines whether a radio condition of one of the one or more LTM candidate gNB-DUs meets a predetermined resource reservation criteria, e.g., a predetermined Reference Signal Receive Power (RSRP) Threshold 340. RSRP is the average received power of a RS resource element. The candidate/target gNB-DU 314 also reserves RACH resources 340, including a RACH preamble, corresponding to the best beam/beam group for the UE 310. Here, the solution mentioned in the RAN1 agreement is used where the event based L1 measurements reports 336 are provided to the Target gNB-DU 314 also, or forwarded 338 to the Target gNB-DU 314.

Based on the radio condition of the LTM candidate cells meeting the predetermined resource reservation criteria, an updated LTM candidate cell configuration for performing a LTM cell switch from the serving cell to a LTM Target cell by the UE is sent by the LTM candidate cells to the gNB-CU-CP S542. Referring to FIG. 3, based on the radio condition of the one or more LTM candidate gNB-DUs 314 meeting the predetermined resource reservation criteria as per the L1 measurement report or UE performing a RACH procedure to acquire candidate cell TA, one or more LTM candidate gNB-DUs 314 initiate reservation of partial or full radio resources for one of one or more LTM candidate cells for a LTM cell switch of the UE 310 from the serving gNB-DU 312 to the one of the one or more LTM candidate cells, i.e., Candidate/Target gNB-DU 314. Based on the received L1 measurement report 336, 338, the Target gNB-DU 314 allocates RACH resources including RACH preamble to the UE 310 according to the best beam/beam-group of the UE 310. Since the RACH resource allocation is performed closer to the Serving Cell 312 change, and based on radio conditions (based on the Pre-defined RSRP Threshold), the allocation of RACH resources by the Target gNB-DU 314 is more appropriate and resource reservation is for a shorter duration. Any other RRM resource that may not have been reserved at the time of candidate cell preparation could be reserved now. The RACH resources and other RRM resources reserved at the Target gNB-DU 314, 336 is sent from Target gNB-DU 314 to the gNB-CU-CP 316 using the UE Context Modification Required message 342 via the F1 interface, or using any other similar procedure. The gNB-CU-CP 316 responds with an UE Context Modification Acknowledgement (ACK) message 344. Referring to FIG. 4, in response to the L1 Measurements reported by the UE 310 being greater than the predetermined resource reservation criteria, the Target gNB-DU 414 indicates to the gNB-CU-UP 418 to initiate Data Forwarding. At least one embodiment as illustrated in FIG. 4 uses Optimized Early Data Forwarding based on the received event based L1 measurement report and a pre-configured L1 RSRP Threshold value where the candidate/target gNB-DU 414 triggers a control PDU 460 or a signaling message via F1/E1 towards the gNB-CU-UP (PDCP host) 418 to initiate data forwarding to the Target gNB-DU 414. A Control PDU is a data packet that is intended to include control information. The Control PDU is a data PDU that is able to be sent to gNB-CU-UP 418 from the Target gNB-DU 414 over the F1-U interface. A control signaling message, i.e., a control plane message, is sent by the Target gNB-DU 414 to gNB-CU-CP 416 over F1, which will be further forwarded to the gNB-CU-UP 418 over the E1 interface because there is not a direct control plane interface between the Target gNB-DU 414 and the gNB-CU-UP 418. The Pre-configured L1 threshold is able to be derived based on LTM HO criteria at the Serving gNB-DU 412. This could be indicated to the Target gNB-DU 414 by the gNB-CU-CP 416. In response to the Target gNB-DU 414 determining that the radio condition of the one of the one or more LTM candidate gNB-DUs drops below the predetermined resource reservation criteria, the Target gNB-DU 414 sends a Control PDU 460 to the gNB-CU-UP 418 to instruct the gNB-CU-UP 418 to stop forwarding of data to the one of the one or more LTM candidate gNB-DUs 414.

The gNB-CU-CP sends the updated radio resource configuration having the reserved partial or full radio resources of the one or more LTM candidate cells to the UE via the serving cell S546. Referring to FIG. 3, the gNB-CU-CP 316 sends the Serving gNB-DU 312 a Downlink (DL) RRC message 350 via an F1 interface. The DL RRC message 350 includes updated radio resource configuration of the candidate/target cell having the reserved partial or full radio resources of the one or more LTM candidate/target cells 314. For example, the F1: DL RRC message 350 is able to include LTM Target Cell Configuration (CFRA Preamble) and Target cell identification as an F1 protocol information. The information provided in the DL RRC Message Transfer message 350 is also used at the Serving gNB-DU 312. The delayed resource reservation is applicable not just for the RACH resources, but also other RRM resources, such as UL PUCCH configuration, etc. The Serving gNB-DU 312 sends to the UE 310 an RRC Reconfiguration message 352. The RRC Reconfiguration message 352 provides the UE the LTM Target Cell Configuration including the CFRA Preamble.

An LTM cell switch from the serving cell to an LTM candidate cell is performed using the updated radio resource configuration S550. Referring to FIG. 3, the UE 310 sends Intra/Inter-Frequency L1 Measurement Report 360 to the Serving gNB-DU 312. The UE 310 also sends Intra/Inter-Frequency L1 Measurement Report 362 to the Target gNB-DU 314. Based on the radio condition of the Target gNB-DU 314 being satisfied, i.e., radio condition being greater than the pre-defined RSRP Threshold, an LTM cell switch is made 370 from the Serving gNB-DU 312 to the prepared Target gNB-DU 314. The Serving gNB-DU 312 sends the UE 310 a MAC CE command 372 (Serving Cell Change Command). The Serving gNB-DU 312 sends the gNB-CU-CP 316 a Serving Cell Change Notification (Cell ID) 374. The UE 310 performs a RACH operation 380 using a RACH preamble that is provided to the Target gNB-DU 314. Then, the UE 310 sends a RRC Reconfiguration Acknowledgement (ACK) 382 to the gNB-CU-CP 316.

The process then terminates S560.

In at least one embodiment, a method for preparing and executing a Lower layer Triggered Mobility (LTM) Handover (HO) procedure includes sending, by a gNB-Centralized Unit Control Plane (gNB-CU-CP) to a User Equipment directly or via a serving gNB-Distributed Units (gNB-DU), one or more Radio Resource Control (RRC) messages with LTM candidate cell configuration of one or more LTM candidate gNB-DUs, based on the one or more RRC messages, sending, by User Equipment or a serving gNB-DU, a Layer 1 (L1) Measurement Report to the one or more LTM candidate gNB-DUs, the L1 measurement report, receiving, at the one or more LTM candidate gNB-DUs, the L1 Measurement Report, in response to receiving the L1 Measurement Report, determining, by the one or more LTM candidate gNB-DUs, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more LTM candidate gNB-DUs to acquire timing advance, initiating, by the one or more LTM candidate gNB-DUs, reservation of partial or full radio resources for one of one or more LTM candidate cells for a LTM cell switch from the serving cell to the one of the one or more LTM candidate cells by the UE, sending, by the one or more LTM candidate gNB-DUs to a gNB-CU-CP, an updated LTM candidate cell configuration corresponding to the partial or full resources, and sending, by the gNB-CU-CP, the updated radio resource configuration for the one or more LTM candidate cells having the partial or full radio resources of the one or more LTM candidate cells to the UE via the serving gNB-DU.

Figure 6:
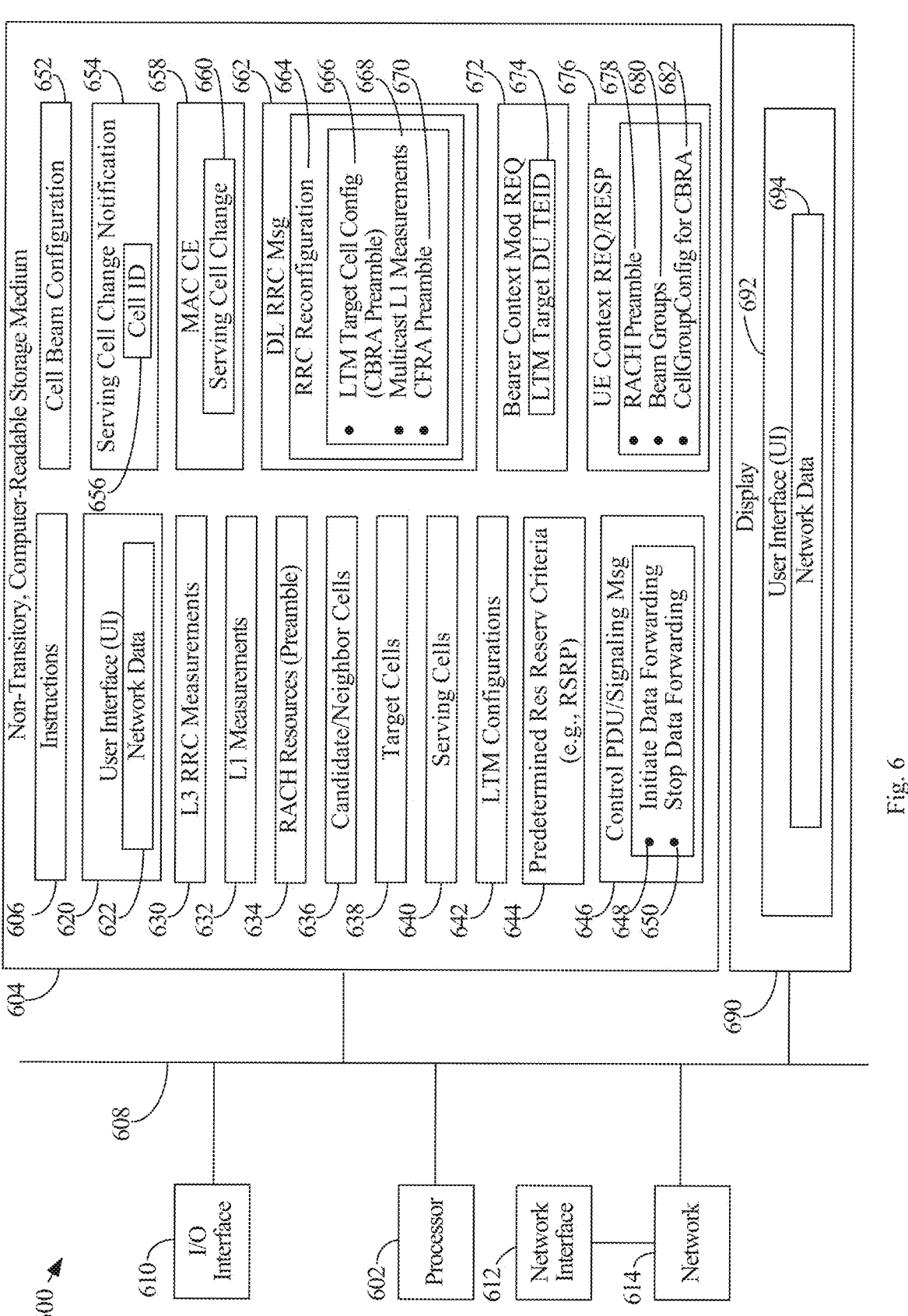
FIG. 6 is a high-level functional block diagram of a processor-based system according to at least one embodiment.

FIG. 6 is a high-level functional block diagram of a processor-based system 600 according to at least one embodiment.

In at least one embodiment, processing circuitry 600 provides enhancements to a Lower-Layer Mobility (LTM) Handover (HO) procedure. Processing circuitry 600 implements enhancements to a LTM HO procedure using Processor 602. Processing circuitry 600 also includes a Non-Transitory, Computer-Readable Storage Medium 604 that is used to implement enhancements to a LTM HO procedure. Non-Transitory, Computer-Readable Storage Medium 604, amongst other things, is encoded with, i.e., stores, Instructions 606, i.e., computer program code, that are executed by Processor 602 causes Processor 602 to perform operations for providing enhancements to a LTM HO procedure. Execution of Instructions 606 by Processor 602 represents (at least in part) an application which implements at least a portion of the methods described herein in accordance with one or more embodiments (hereinafter, the noted processes and/or methods).

Processor 602 is electrically coupled to Non-Transitory, Computer-Readable Storage Medium 604 via a Bus 608. Processor 602 is electrically coupled to an Input/Output (I/O) Interface 610 by Bus 608. A Network Interface 612 is also electrically connected to Processor 602 via Bus 608. Network Interface 612 is connected to a Network 614, so that Processor 602 and Non-Transitory, Computer-Readable Storage Medium 604 connect to external elements via Network 614. Processor 602 is configured to execute Instructions 606 encoded in Non-Transitory, Computer-Readable Storage Medium 604 to cause processing circuitry 600 to be usable for performing at least a portion of the processes and/or methods. In one or more embodiments, Processor 602 is a Central Processing Unit (CPU), a multiprocessor, a distributed processing system, an Application Specific Integrated Circuit (ASIC), and/or a suitable processing unit.

Processing circuitry 600 includes I/O Interface 610. I/O interface 610 is coupled to external circuitry. In one or more embodiments, I/O Interface 610 includes a keyboard, keypad, mouse, trackball, trackpad, touchscreen, and/or cursor direction keys for communicating information and commands to Processor 602.

Processing circuitry 600 also includes Network Interface 612 coupled to Processor 602. Network Interface 612 allows processing circuitry 600 to communicate with Network 614, to which one or more other computer systems are connected. Network Interface 612 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 600 is configured to receive information through I/O Interface 610. The information received through I/O Interface 610 includes one or more of instructions, data, design rules, libraries of cells, and/or other parameters for processing by Processor 602. The information is transferred to Processor 602 via Bus 608. Processing circuitry 600 is configured to receive information related to a User Interface (UI) 620 through I/O Interface 610. The information is stored in Non-Transitory, Computer-Readable Storage Medium 604 as UI 620. UI 620 is able to process Network Data 622.

In one or more embodiments, one or more Non-Transitory, Computer-Readable Storage Medium 604 having stored thereon Instructions 606 (in compressed or uncompressed form) that may be used to program a computer, processor, or other electronic device) to perform processes or methods described herein. The one or more Non-Transitory, Computer-Readable Storage Medium 604 include one or more of an electronic storage medium, a magnetic storage medium, an optical storage medium, a quantum storage medium, or the like.

For example, the Non-Transitory, Computer-Readable Storage Medium 604 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 604 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 604 stores Instructions 606 configured to cause Processor 602 to perform at least a portion of the processes and/or methods for providing enhancements to a LTM HO procedure. In one or more embodiments, Non-Transitory, Computer-Readable Storage Medium 604 also stores information, such as algorithm which facilitates performing at least a portion of the processes and/or methods for providing enhancements to a LTM HO procedure.

Accordingly, in at least one embodiment, Processor 602 executes Instructions 606 stored on the one or more Non-Transitory, Computer-Readable Storage Medium 604 to implement enhancements to a LTM HO procedure. Network Data 622 is processed via User Interface 620. A UE is configured for L1/L2 Triggered Mobility (LTM) with LTM candidate cells. Non-Transitory, Computer-Readable Storage Medium 604 stores data for implementing the enhancements to a LTM HO procedure. For example, Non-Transitory, Computer-Readable Storage Medium 604 stores L3 RRC Measurements 630 from a UE. UE Context Setup Request and Response 676 provides Cell Group Config for CBRA 682. User Equipment (UE) is then sent DL RRC Message 662. DL RRC Message 662 provides RRC Reconfiguration such as LTM Target Cell Configuration 666 and Multicast L1 Measurements 668. Based on the RRC Reconfiguration 664, the UE returns L1 Measurements 632 to a Serving Cell and to a Target Cell. RACH resources 634, including a RACH preamble, are also maintained in Non-Transitory, Computer-Readable Storage Medium 604. Information identifying and relating to Candidate/Neighbor Cells 636, Target Cells 638 and Serving Cells 640 are stored in Non-Transitory, Computer-Readable Storage Medium 604. LTM Configurations 642 are also maintained in Non-Transitory, Computer-Readable Storage Medium 604. The L1 measurements 632 for the LTM Candidate Cells 636 are received from the UE. Based on the L1 Measurements 632, whether a radio condition of the LTM Candidate Cells 636 meet a Predetermined Resource Reservation Criteria 644, such as a RSRP. In response to L1 Measurements 632 meeting the Predetermined Resource Reservation Criteria 644, updated radio resource configurations are determined, such as LTM Target Cell Configuration 666, including CBRA Preamble, Multicast L1 Measurements 668, and CFRA Preamble 670 using a UE Context Modification Request/Response 676 sent, for example, over an F1 interface. Further, In response to L1 Measurements 632 meeting the Predetermined Resource Reservation Criteria 644, reservation of partial or full radio resources for one of one or more LTM candidate cells for a LTM cell switch from the serving cell to the one of the one or more LTM candidate cells by the UE is initiated. UE Context Modification Request/Response 676 includes a RACH preamble 678 and Beam Groups 680. An LTM target cell 638 is prepared without reserving a RACH resources 634, including a RACH preamble. User Equipment (UE) is sent DL RRC Message 662. A second DL RRC Message 662 provides an updated radio resource configuration. The second DL RRC Message 662 includes RRC Reconfiguration such as LTM Target Cell Configuration with CBRA Preamble 666. In at least one other embodiment, in response to L1 Measurements 632 meeting the Predetermined Resource Reservation Criteria 644, Data Forwarding is initiated 648 using a Control PDU/Signaling Message 646. Bearer Context Modification Request 672 provides LTM Target DU Tunnel Endpoint Identifier (TEID) 674. The data forwarding to the LTM target cell is stopped 650 based on the radio condition of the LTM target cell dropping below the Predetermined Resource Reservation Criteria 644. The Predetermined Resource Reservation Criteria 644 is also able to include a Stop L1-RSRP threshold. After the UE is provided the RRC Reconfiguration 664, the UE provides updated L1 Measurements 632 to the Serving Cell and the Target Cell. In response to the radio condition for the target sell being satisfied, a Serving Cell Change is performed to the Target Cell. The Serving Cell sends a MAC CE 658 to the UE that includes a Serving Cell Change command 660. The UE sends a Serving Cell Change Notification 654 including the Cell ID 656. RACH resources 634, including a RACH preamble of the LTM Target Cell 638 are provided to the UE before the Serving Cell Change 660 change takes place. The providing the RACH resources 634, including the RACH preamble of the LTM Target Cell 638 to the UE before the Serving Cell Change 660 change takes place is able to include assigning the RACH resources 634, including the RACH preamble, that corresponds to a best cell beam configuration 652 for the UE, including a best Beam Group 680. Display 690 includes a User Interface 692 for presenting Network Data 694.

At least one embodiment of the method for preparing and executing a Lower layer Triggered Mobility (LTM) Handover (HO) procedure includes sending, by a gNB-Centralized Unit Control Plane (gNB-CU-CP) to a User Equipment directly or via a serving gNB-Distributed Units (gNB-DU), one or more Radio Resource Control (RRC) messages with LTM candidate cell configuration of one or more LTM candidate gNB-DUs, based on the one or more RRC messages, sending, by User Equipment or a serving gNB-DU, a Layer 1 (L1) Measurement Report to the one or more LTM candidate gNB-DUs, the L1 measurement report, receiving, at the one or more LTM candidate gNB-DUs, the L1 Measurement Report, in response to receiving the L1 Measurement Report, determining, by the one or more LTM candidate gNB-DUs, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more LTM candidate gNB-DUs to acquire timing advance, initiating, by the one or more LTM candidate gNB-DUs, reservation of partial or full radio resources for one of one or more LTM candidate cells for a LTM cell switch from the serving cell to the one of the one or more LTM candidate cells by the UE, sending, by the one or more LTM candidate gNB-DUs to a gNB-CU-CP, an updated LTM candidate cell configuration corresponding to the partial or full radio resources, and sending, by the gNB-CU-CP, the updated radio resource configuration for the one or more LTM candidate cells having the partial or full radio resources of the one or more LTM candidate cells to the UE via the serving gNB-DU.

Embodiments described herein provide method that provides one or more advantages. For example, configuration for LTM handover takes take place at the gNB-CU-CP, but LTM handover is executed autonomously by the gNB-DU without further interaction with the upper layers. The lead time duration between LTM HO preparation and execution is reduced and only target candidate cell configurations that end up in LTM serving cell changes are provided. The problem of slow data forwarding is eliminated and overhead in terms of processing and buffer occupancy is reduced.

An aspect of this description is directed to a method [1] for preparing and executing a Layer 1-Layer 2 (L1/L2) Triggered Mobility (LTM) Handover (HO) procedure includes receiving, a Layer 1 (L1) Measurement Report directly at one or more LTM candidate gNB-Distributed Units (gNB-DUs) from User Equipment (UE) or from a serving gNB-DU, wherein the L1 Measurement Report is based on one or more Radio Resource Control (RRC) messages with LTM candidate cell configuration of the one or more LTM candidate gNB-DUs sent earlier to the UE via a serving cell;

in response to receiving the L1 Measurement Report, determining by the one or more LTM candidate gNB-DUs, whether a radio condition of one of the one or more LTM candidate gNB-DUs meets a predetermined resource reservation criteria;

based on the radio condition of the one or more LTM candidate gNB-DUs meeting the predetermined resource reservation criteria or upon the UE performing Uplink (UL) Synchronization by sending a Random-Access CHannel (RACH) request to the one or more LTM candidate gNB-DUs to acquire timing advance, initiating, by the one or more LTM candidate gNB-DUs, reservation of partial or full radio resources for one of one or more LTM candidate cells for a LTM cell switch from the serving cell to the one of the one or more LTM candidate cells by the UE; and sending an updated radio resource configuration for the one or more LTM candidate cells having the reserved partial or full radio resources of the one or more LTM candidate cells to the UE via the serving gNB-DU.

The method described in [1] wherein the determining whether the radio condition of the one of the one or more LTM candidate gNB-DUs meets the predetermined resource reservation criteria further comprises determining at least whether L1 measurements of the one of the one or more LTM candidate cells are greater than a pre-defined Reference Signals Received Power (RSRP) threshold.

The method described in [1] to [2], further includes the one or more candidate gNB-DUs initiating data forwarding from a gNB-Centralized Unit User Plane (gNB-CU-UP) to the one or more LTM candidate gNB-DUs, based on the radio condition of the one of the one or more LTM candidate gNB-DUs, as reported by the UE, meeting the predetermined resource reservation criteria.

The method described in [1] to [3], further includes determining the radio condition of the one of the one or more LTM candidate gNB-DUs drops below the predetermined resource reservation criteria, and, in response, stopping the data forwarding of data to the one of the one or more LTM candidate gNB-DUs.

The method described in [1] to [4], wherein the initiating, by the one or more LTM candidate gNB-DUs, the reservation of the partial or full radio resources at the one of the one or more LTM candidate cells of the UE comprises initiating reservation of at least Random Access Channel (RACH) resources comprising a RACH preamble of the one of the one or more LTM candidate cells of the UE before the LTM cell switch from the serving cell to the one of the one of the one or more LTM candidate cells.

The method described in [1] to [5], wherein the initiating, by the one or more LTM candidate gNB-DUs, reservation of the at least RACH resources of the one of the one or more LTM candidate cells of the UE comprises initiating reservation of the at least RACH resources of the one of the one or more LTM candidate cells of the UE comprising the RACH preamble corresponding to a best beam or a best beam-group of the one of the one or more LTM candidate cells for the UE, based on the L1 measurement report.

The method described in [1] to [6], wherein the initiating the data forwarding from the gNB-CU-UP to the one or more LTM candidate gNB-DUs is triggered based on receiving, at the gNB-CU-UP, a control-Protocol Data Unit (PDU) from the one of the one or more LTM candidate gNB-DUs or a signaling message from the one of the one or more LTM candidate gNB-DUs via a gNB Centralized Unit (gNB-CU) over F1 and E1 interfaces respectively.

The method described in [1] to [7] further includes, prior to receiving the L1 Measurement Report, configuring the UE for L1/L2 Triggered Mobility (LTM) with the one or more LTM candidate cells, receiving, at the gNB-CU-CP, Layer 3 (L3) RRC Measurements from the UE, and sending one or more RRC Reconfiguration messages with LTM Candidate Cell Configuration of the one or more LTM candidate cells to the UE via the serving gNB-DU.

An aspect of this description is directed to a Next Generation-Radio Access Network (NG-RAN) Node comprising a candidate distributed unit (DU) [9], the candidate DU including a memory storing computer-readable instructions, and a processor connected to the memory, wherein the processor is configured to execute the computer-readable instructions to perform operations to receive a Layer 1 (L1) Measurement Report directly at one or more Layer 1-Layer 2 (L1/L2) Triggered Mobility (LTM) candidate gNB-Distributed Units (gNB-DUs) from User Equipment (UE) or from a serving gNB-DU via the gNB-CU, wherein the L1 Measurement Report is based on one or more Radio Resource Control (RRC) messages with LTM candidate cell configuration of one or more LTM candidate gNB-DUs sent earlier to the UE via a serving cell, in response to receiving the L1 Measurement Report, determine whether a radio condition of one of the one or more LTM candidate gNB-DUs meets a predetermined resource reservation criteria, based on the radio condition of the one of the one or more LTM candidate gNB-DUs meeting the predetermined resource reservation criteria or upon the UE performing Uplink (UL) Synchronization by sending a Random-Access CHannel (RACH) request to the one or more candidate gNB-DUs to acquire timing advance of candidate cell, initiate, at the one or more LTM candidate gNB-DUs, reservation of partial or full radio resources for one of one or more LTM candidate cells for an LTM cell switch from the serving cell to the one of the one or more LTM candidate cells by the UE, and sending an updated radio resource configuration for the one or more candidate cells having the partial or full radio resources of the one or more LTM candidate cells to the UE via the serving gNB-DU.

The Next Generation-Radio Access Network (NG-RAN) Node comprising a candidate distributed unit described in [9], wherein the processor is further configured to determine whether the radio condition of the one of the one or more LTM candidate gNB-DUs meets the predetermined resource reservation criteria by determining at least whether L1 measurements of the one of the one or more LTM candidate cells are greater than a pre-defined Reference Signals Received Power (RSRP) threshold.

The Next Generation-Radio Access Network (NG-RAN) Node comprising a candidate distributed unit described in [9] to [10], wherein the processor is further configured to initiate data forwarding to one of the one or more LTM candidate gNB-DUs, based on the radio condition of the one of the one or more LTM candidate gNB-DUs, as reported by the UE, meeting the predetermined resource reservation criteria.

The Next Generation-Radio Access Network (NG-RAN) Node comprising a candidate distributed unit described in [9] to [11], wherein the processor is further configured to determine the radio condition of the one of the one or more LTM candidate gNB-DUs drops below the predetermined resource reservation criteria, and, in response, stop the data forwarding of data to the one of the one or more LTM candidate gNB-DUs.

The Next Generation-Radio Access Network (NG-RAN) Node comprising a candidate distributed unit described in [9] to [12], wherein the processor is further configured to initiate, at the one or more LTM candidate gNB-DUs, the reservation of the partial or full radio resources at the one of the one or more LTM candidate cells of the UE by initiating reservation of Random Access Channel (RACH) resources comprising a RACH preamble of the one of the one or more LTM candidate cells of the UE before the LTM cell switch from the serving cell to the one of the one of the one or more LTM candidate cells.

The Next Generation-Radio Access Network (NG-RAN) Node comprising a candidate distributed unit described in [9] to [13], wherein the processor is further configured to initiate, at the one or more LTM candidate gNB-DUs, reservation of the at least RACH resources of the one of the one or more LTM candidate cells of the UE by initiating reservation of the at least RACH resources of the one of the one or more LTM candidate cells of the UE comprising the RACH preamble corresponding to a best beam or a best beam-group of the one or more LTM candidate cells for the UE, based on the L1 measurement report.

The Next Generation-Radio Access Network (NG-RAN) Node comprising a candidate distributed unit described in [9] to [14], wherein the processor is further configured to initiate the data forwarding from a gNB Centralized Unit User Plane (gNB-CU-UP) to the one or more LTM candidate gNB-DUs based on receiving a control-Protocol Data Unit (PDU) from the one of the one or more LTM candidate gNB-DUs or a signaling message from the one of the one or more LTM candidate gNB-DUs via the a gNB Centralized Unit Control Plane (gNB-CU-CP) over F1 and E1 interfaces respectively.

The Next Generation-Radio Access Network (NG-RAN) Node comprising a candidate distributed unit described in [9] to [15], wherein the processor is further configured to, prior to receiving the L1 Measurement Report, configure the UE for L1/L2 Triggered Mobility (LTM) with the one or more LTM candidate cells, receive Layer 3 (L3) RRC Measurements from the UE, and send one or more RRC Reconfiguration messages with LTM Candidate Cell Configuration of the one or more LTM candidate cells to the UE.

An aspect of this description is directed to a non-transitory computer-readable media having computer-readable instructions stored thereon [17], which when executed by a processor causes the processor to perform operations including receiving, a Layer 1 (L1) Measurement Report directly at one or more LTM candidate gNB-Distributed Units (gNB-DUs) from User Equipment (UE) or from a serving gNB-DU, wherein the L1 Measurement Report is based on one or more Radio Resource Control (RRC) messages with LTM candidate cell configuration of the one or more LTM candidate gNB-DUs sent earlier to the UE via a serving cell, in response to receiving the L1 Measurement Report, determining by the one or more LTM candidate gNB-DUs, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more candidate gNB-DUs to acquire timing advance, initiating, by the one or more LTM candidate gNB-DUs, reservation of partial or full radio resources for one of one or more LTM candidate cells for a LTM cell switch from the serving cell to the one of the one or more LTM candidate cells by the UE, and sending an updated radio resource configuration for the one or more candidate cells having the partial or full radio resources of the one or more LTM candidate cells to the UE via the serving gNB-DU.

An aspect of this description is directed to a method for preparing and executing a Layer 1-Layer 2 (L1/L2) Triggered Mobility (LTM) Handover (HO) procedure includes receiving, at a candidate gNB Distributed Unit (gNB-DU), a Layer 1 (L1) Measurement Report for the one or more LTM candidate cells, based on the L1 Measurement Report, determining by the candidate gNB-DU whether a radio condition of one of the one or more LTM candidate cells meets a predetermined resource reservation criteria, based on the radio condition of the one of the one or more LTM candidate cells meeting the predetermined resource reservation criteria or upon the UE performing Uplink (UL) Synchronization by sending a Random-Access CHannel (RACH) request to the one or more candidate gNB-DUs to acquire timing advance, determining reserved partial or full radio resources for the one of the one or more LTM candidate cells for a LTM cell switch to the one of the one or more LTM candidate cells by the UE, and sending, by the candidate gNB-DU to a gNB-Centralized Unit Control Plane (gNB-CU-CP), an updated LTM candidate cell configuration corresponding to the reserved partial or full radio resources.

The method described in wherein the sending the updated LTM candidate cell configuration corresponding to the reserved partial or full radio resources comprises sending a F1: UE Context Modification Required message to the gNB-CU-CP, receiving, from the gNB-CU-CP, a UE Context Modification Acknowledgement from the gNB-CU-CP, and sending, from the gNB-CU-CP an RRC Reconfiguration message including the updated LTM candidate cell configuration to the UE.

The method described in to [19], further includes receiving, by the candidate gNB-DU, data from a gNB-Centralized Unit User Plane (gNB-CU-UP) based on the radio condition of the candidate gNB-DU meeting the predetermined resource reservation criteria.

The method described in to [20], further includes sending, to a gNB-Centralized Unit User Plane (gNB-CU-UP), a control-Protocol Data Unit (PDU), or a signaling message.

The method described in to [21], further includes sending, from the candidate gNB-DU to a gNB-Centralized Unit User Plane (gNB-CU-UP), a Stop Data Forwarding indication to stop forwarding of data to the candidate gNB-DU in response to the radio condition of the candidate gNB-DU dropping below a predetermined resource reservation criteria.

The method described in to [22], further includes receiving, at the gNB-DU, at least Random Access Channel (RACH) resources comprising a RACH preamble included in updated radio resource configuration sent to the UE.

The method described in to [23], wherein the receiving, at the gNB-DU, the at least Random Access Channel (RACH) resources comprising a RACH preamble comprises receiving the at least Random Access Channel (RACH) resources comprising the RACH preamble corresponding to a best beam or a best beam-group of the candidate gNB-DU, based on the L1 measurement report.

An aspect of this description is directed to a Next Generation-Radio Access Network (NG-RAN) Node comprising a candidate gNB Distributed Unit (gNB-DU) [25], the gNB-DU including a memory storing computer-readable instructions, and a processor connected to the memory, wherein the processor is configured to execute the computer-readable instructions to perform operations to receive a Layer 1 (L1) Measurement Report for one or more LTM candidate cells, based on the L1 Measurement Report, determine whether a radio condition of one of the one or more LTM candidate cells meets a predetermined resource reservation criteria, based on the radio condition of the one of the one or more LTM candidate cells meeting the predetermined resource reservation criteria or upon the UE performing Uplink (UL) Synchronization by sending a Random-Access CHannel (RACH) request to the one or more candidate cells to acquire timing advance, determining reserved partial or full radio resources for the one of the one or more LTM candidate cells for a LTM cell switch to the one of the one or more LTM candidate cells by the UE, and sending, to a gNB-Centralized Unit User Plane (gNB-CU-CP), an updated LTM candidate cell configuration corresponding to the reserved partial or full radio resources.

The Next Generation-Radio Access Network (NG-RAN) Node comprising a gNB-DU described in [25], wherein the processor is further configured to send the updated LTM candidate cell configuration corresponding to the reserved partial or full radio resources by sending a F1: UE Context Modification Required message to the gNB-CU-CP, and receiving, from the gNB-CU-CP, a UE Context Modification Acknowledgement from the gNB-CU-CP.

The Next Generation-Radio Access Network (NG-RAN) Node comprising a gNB-DU described in to [26], wherein the processor is further configured to receive data from a gNB-Centralized Unit User Plane (gNB-CU-UP) based on the radio condition of a candidate cell meeting the predetermined resource reservation criteria, as per the L1 measurement report.

The Next Generation-Radio Access Network (NG-RAN) Node comprises a gNB-DU described in to [27], wherein the processor is further configured to send, to a gNB-Centralized Unit User Plane (gNB-CU-UP), a control-Protocol Data Unit (PDU), or a signaling message.

The Next Generation-Radio Access Network (NG-RAN) Node comprising a gNB-DU described in to [28], wherein the processor is further configured to send, to a gNB-Centralized Unit User Plane (gNB-CU-UP), a Stop Data Forwarding indication to stop forwarding of data in response to the radio condition dropping below a predetermined resource reservation criteria.

The Next Generation-Radio Access Network (NG-RAN) Node comprising a gNB-DU described in to [29], wherein the processor is further configured to receive at least Random Access Channel (RACH) resources comprising a RACH preamble included in updated radio resource configuration sent to the UE.

The Next Generation-Radio Access Network (NG-RAN) Node comprising a gNB-DU described in to [30], wherein the processor is further configured to receive the at least Random Access Channel (RACH) resources comprising a RACH preamble by receiving the at least Random Access Channel (RACH) resources comprising the RACH preamble corresponding to a best beam or a best beam-group, based on the L1 measurement report.

An aspect of this description is directed to a non-transitory computer-readable media having computer-readable instructions stored thereon [32], which when executed by a processor causes the processor to perform operations including receiving, at a candidate gNB Distributed Unit (gNB-DU), a Layer 1 (L1) Measurement Report for one or more LTM candidate cells, based on the L1 Measurement Report, determining by the candidate gNB-DU whether a radio condition of one of the one or more LTM candidate cells meets a predetermined resource reservation criteria, based on the radio condition of the one of the one or more LTM candidate cells meeting the predetermined resource reservation criteria or upon the UE performing Uplink (UL) Synchronization by sending a Random-Access CHannel (RACH) request to the one or more candidate cells to acquire timing advance, determining reserved partial or full radio resources for the one of the one or more LTM candidate cells for a LTM cell switch to the one of the one or more LTM candidate cells by the UE, and sending, by the candidate gNB-DU to a gNB-Centralized Unit Control Plane (gNB-CU-CP), an updated LTM candidate cell configuration corresponding to the reserved partial or full radio resources.

An aspect of this description is directed to a method for preparing and executing a Layer 1-Layer 2 (L1/L2) Triggered Mobility (LTM) Handover (HO) procedure includes sending, by a gNB-Centralized Unit Control Plane (gNB-CU-CP) to a User Equipment directly or via a serving gNB-Distributed Units (gNB-DU), one or more Radio Resource Control (RRC) messages with LTM candidate cell configuration of one or more LTM candidate gNB-DUs, based on the one or more RRC messages, sending, by User Equipment or a serving gNB-DU, a Layer 1 (L1) Measurement Report to the one or more LTM candidate gNB-DUs, the L1 measurement report, receiving, at the one or more LTM candidate gNB-DUs, the L1 Measurement Report, in response to receiving the L1 Measurement Report, determining, by the one or more LTM candidate gNB-DUs, whether a radio condition of one of the one or more LTM candidate gNB-DUs meets a predetermined resource reservation criteria, based on the radio condition of the one or more LTM candidate gNB-DUs meeting the predetermined resource reservation criteria or upon the UE performing Uplink (UL) Synchronization by sending a Random-Access CHannel (RACH) request to the one or more candidate cells to acquire timing advance, initiating, by the one or more LTM candidate gNB-DUs, reservation of partial or full radio resources for one of one or more LTM candidate cells for a LTM cell switch from the serving cell to the one of the one or more LTM candidate cells by the UE, sending, by the one or more LTM candidate gNB-DUs to a gNB-CU-CP, an updated LTM candidate cell configuration corresponding to the partial or full radio resources, and sending, by the gNB-CU-CP, the updated radio resource configuration having the partial or full radio resources of the one or more LTM candidate cells to the UE via the serving gNB-DU.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for preparing and executing a Layer 1-Layer 2 (L1/L2) Triggered Mobility (LTM) Handover (HO) procedure, comprising:

receiving, a Layer 1 (L1) Measurement Report directly at one or more LTM candidate gNB-Distributed Units (gNB-DUs) from one of a User Equipment (UE) or a serving gNB-DU, wherein the L1 Measurement Report is based on one or more Radio Resource Control (RRC) messages with an LTM candidate cell configuration of the one or more LTM candidate gNB-DUs sent earlier to the UE via a serving cell;

determining, by the one or more LTM candidate gNB-DUs in response to receiving the L1 Measurement Report, whether a radio condition of one of the one or more LTM candidate gNB-DUs meets a predetermined resource reservation criteria;

initiating, by the one or more LTM candidate gNB-DUs in response to the radio condition of the one or more LTM candidate gNB-DUs meeting the predetermined resource reservation criteria or in response to the UE performing Uplink (UL) Synchronization by sending a Random-Access CHannel (RACH) request to the one or more LTM candidate gNB-DUs to acquire timing advance, reservation of partial or full radio resources for one of one or more LTM candidate cells for a LTM cell switch from the serving cell to the one of the one or more LTM candidate cells by the UE; and sending an updated radio resource configuration for the one or more LTM candidate cells having the reserved partial or full radio resources of the one or more LTM candidate cells to the UE via the serving gNB-DU.

2. The method of claim 1, wherein the determining whether the radio condition of the one of the one or more LTM candidate gNB-DUs meets the predetermined resource reservation criteria further comprises determining at least whether L1 measurements of the one of the one or more LTM candidate cells are greater than a pre-defined Reference Signals Received Power (RSRP) threshold.

3. The method of claim 1 further comprises the one or more candidate gNB-DUs initiating data forwarding from a gNB-Centralized Unit User Plane (gNB-CU-UP) to the one or more LTM candidate gNB-DUs, based on the radio condition of the one of the one or more LTM candidate gNB-DUs, as reported by the UE, meeting the predetermined resource reservation criteria.

4. The method of claim 3 further comprises determining the radio condition of the one of the one or more LTM candidate gNB-DUs drops below the predetermined resource reservation criteria, and, in response, stopping the data forwarding of data to the one of the one or more LTM candidate gNB-DUs.

5. The method of claim 3, wherein the initiating, by the one or more LTM candidate gNB-DUs, the reservation of the partial or full radio resources at the one of the one or more LTM candidate cells of the UE comprises initiating reservation of at least Random Access Channel (RACH) resources comprising a RACH preamble of the one of the one or more LTM candidate cells of the UE before the LTM cell switch from the serving cell to the one of the one of the one or more LTM candidate cells.

6. The method of claim 5, wherein the initiating, by the one or more LTM candidate gNB-DUs, reservation of the at least RACH resources of the one of the one or more LTM candidate cells of the UE comprises initiating reservation of the at least RACH resources of the one of the one or more LTM candidate cells of the UE comprising the RACH preamble corresponding to a best beam or a best beam-group of the one of the one or more LTM candidate cells for the UE, based on the L1 measurement report.

7. The method of claim 3, wherein the initiating the data forwarding from the gNB-CU-UP to the one or more LTM candidate gNB-DUs is triggered based on receiving, at the gNB-CU-UP, a control-Protocol Data Unit (PDU) from the one of the one or more LTM candidate gNB-DUs or a signaling message from the one of the one or more LTM candidate gNB-DUs via a gNB Centralized Unit (gNB-CU) over F1 and E1 interfaces respectively.

8. The method of claim 1, further comprising:

prior to receiving the L1 Measurement Report:

configuring the UE for L1/L2 Triggered Mobility (LTM) with the one or more LTM candidate cells;

receiving, at a gNB-Centralized Unit User Plane (gNB-CU-UP), Layer 3 (L3) RRC Measurements from the UE; and sending one or more RRC Reconfiguration messages with LTM Candidate Cell Configuration of the one or more LTM candidate cells to the UE via the serving gNB-DU.

9. A Next Generation-Radio Access Network (NG-RAN) Node comprising a candidate distributed unit (DU), the candidate DU comprising:

a memory storing computer-readable instructions; and a processor connected to the memory, wherein the processor is configured to execute the computer-readable instructions to perform operations to:

receive a Layer 1 (L1) Measurement Report directly at one or more Layer 1-Layer 2 (L1/L2) Triggered Mobility (LTM) candidate gNB-Distributed Units (gNB-DUs) from one of a User Equipment (UE) or a serving gNB-DU via the gNB-CU, wherein the L1 Measurement Report is based on one or more Radio Resource Control (RRC) messages with an LTM candidate cell configuration of one or more LTM candidate gNB-DUs sent earlier to the UE via a serving cell;

determine, in response to receiving the L1 Measurement Report, whether a radio condition of one of the one or more LTM candidate gNB-DUs meets a predetermined resource reservation criteria;

initiate, at the one or more LTM candidate gNB-DUs in response to the radio condition of the one of the one or more LTM candidate gNB-DUs meeting the predetermined resource reservation criteria or in response to the UE performing Uplink (UL) Synchronization by sending a Random-Access CHannel (RACH) request to the one or more candidate gNB-DUs to acquire timing advance of candidate cell, reservation of partial or full radio resources for one of one or more LTM candidate cells for an LTM cell switch from the serving cell to the one of the one or more LTM candidate cells by the UE; and send an updated radio resource configuration for the one or more candidate cells having the partial or full radio resources of the one or more LTM candidate cells to the UE via the serving gNB-DU.

10. The NG-RAN Node of claim 9, wherein the processor is configured to determine whether the radio condition of the one of the one or more LTM candidate gNB-DUs meets the predetermined resource reservation criteria by determining at least whether L1 measurements of the one of the one or more LTM candidate cells are greater than a pre-defined Reference Signals Received Power (RSRP) threshold.

11. The NG-RAN Node of claim 9, wherein the processor is configured to initiate data forwarding to one of the one or more LTM candidate gNB-DUs, based on the radio condition of the one of the one or more LTM candidate gNB-DUs, as reported by the UE, meeting the predetermined resource reservation criteria.

12. The NG-RAN Node of claim 11, wherein the processor is further configured to determine the radio condition of the one of the one or more LTM candidate gNB-DUs drops below the predetermined resource reservation criteria, and, in response, stop the data forwarding of data to the one of the one or more LTM candidate gNB-DUs.

13. The NG-RAN Node of claim 11, wherein the processor is configured to initiate, at the one or more LTM candidate gNB-DUs, the reservation of the partial or full radio resources at the one of the one or more LTM candidate cells of the UE by initiating reservation of Random Access Channel (RACH) resources comprising a RACH preamble of the one of the one or more LTM candidate cells of the UE before the LTM cell switch from the serving cell to the one of the one of the one or more LTM candidate cells.

14. The NG-RAN Node of claim 13, wherein the processor is configured to initiate, at the one or more LTM candidate gNB-DUs, reservation of the at least RACH resources of the one of the one or more LTM candidate cells of the UE by initiating reservation of the at least RACH resources of the one of the one or more LTM candidate cells of the UE comprising the RACH preamble corresponding to a best beam or a best beam-group of the one or more LTM candidate cells for the UE, based on the L1 measurement report.

15. The NG-RAN Node of claim 11, wherein the processor is configured to initiate the data forwarding from a gNB Centralized Unit User Plane (gNB-CU-UP) to the one or more LTM candidate gNB-DUs based on receiving a control-Protocol Data Unit (PDU) from the one of the one or more LTM candidate gNB-DUs or a signaling message from the one of the one or more LTM candidate gNB-DUs via a gNB Centralized Unit Control Plane (gNB-CU-CP) over F1 and E1 interfaces respectively.

16. The NG-RAN Node of claim 9, wherein the processor is further configured to:

prior to receiving the L1 Measurement Report:

configure the UE for L1/L2 Triggered Mobility (LTM) with the one or more LTM candidate cells;

receive Layer 3 (L3) RRC Measurements from the UE; and send one or more RRC Reconfiguration messages with LTM Candidate Cell Configuration of the one or more LTM candidate cells to the UE.

17. A non-transitory computer-readable media medium having computer-readable instructions stored thereon, which when executed by a processor causes the processor to perform operations comprising:

receiving, a Layer 1 (L1) Measurement Report directly at one or more LTM candidate gNB-Distributed Units (gNB-DUs) from one of a User Equipment (UE) or a serving gNB-DU, wherein the L1 Measurement Report is based on one or more Radio Resource Control (RRC) messages with an LTM candidate cell configuration of the one or more LTM candidate gNB-DUs sent earlier to the UE via a serving cell;

determining, by the one or more LTM candidate gNB-DUs in response to receiving the L1 Measurement Report, whether a radio condition of one of the one or more LTM candidate gNB-DUs meets a predetermined resource reservation criteria;

initiating, by the one or more LTM candidate gNB-DUs in response to the radio condition of the one or more LTM candidate gNB-DUs meeting the predetermined resource reservation criteria or in response to the UE performing Uplink (UL) Synchronization by sending a Random-Access CHannel (RACH) request to the one or more LTM candidate gNB-DUs to acquire timing advance, reservation of partial or full radio resources for one of one or more LTM candidate cells for a LTM cell switch from the serving cell to the one of the one or more LTM candidate cells by the UE; and sending an updated radio resource configuration for the one or more candidate cells having the partial or full radio resources of the one or more LTM candidate cells to the UE via the serving gNB-DU.

18. The non-transitory computer-readable medium of claim 17, wherein the determining whether the radio condition of the one of the one or more LTM candidate gNB-DUs meets the predetermined resource reservation criteria further comprises determining at least whether L1 measurements of the one of the one or more LTM candidate cells are greater than a pre-defined Reference Signals Received Power (RSRP) threshold.

19. The non-transitory computer-readable medium of claim 17, wherein the operations further comprise the one or more candidate gNB-DUs initiating data forwarding from a gNB-Centralized Unit User Plane (gNB-CU-UP) to the one or more LTM candidate gNB-DUs, based on the radio condition of the one of the one or more LTM candidate gNB-DUs, as reported by the UE, meeting the predetermined resource reservation criteria.

20. The non-transitory computer-readable medium of claim 19, wherein the operations further comprise determining the radio condition of the one of the one or more LTM candidate gNB-DUs drops below the predetermined resource reservation criteria, and, in response, stopping the data forwarding of data to the one of the one or more LTM candidate gNB-DUs.

* * * * *